US010997583B1

(12) United States Patent
Blackie et al.

(10) Patent No.: US 10,997,583 B1
(45) Date of Patent: May 4, 2021

(54) TEMPORARILY PROVISIONING CARD ON FILE PAYMENT FUNCTIONALITY TO PROXIMATE MERCHANTS

(71) Applicant: Square, Inc., San Francisco, CA (US)

(72) Inventors: Shane Blackie, San Francisco, CA (US); Prashan Dharmasena, San Francisco, CA (US); Justin McKibben, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 24 days.

(21) Appl. No.: 16/120,133

(22) Filed: Aug. 31, 2018

(51) Int. Cl.
*G06Q 20/20* (2012.01)
*G06Q 20/32* (2012.01)

(52) U.S. Cl.
CPC ......... *G06Q 20/3278* (2013.01); *G06Q 20/20* (2013.01)

(58) Field of Classification Search
CPC ......... G06Q 20/32; G06Q 20/34; G06Q 20/20
USPC .......................................................... 705/39
See application file for complete search history.

(56) References Cited

U.S. PATENT DOCUMENTS

| | | |
|---|---|---|
| 5,870,723 A | 2/1999 | Pare, Jr. et al. |
| 5,960,411 A | 9/1999 | Hartman et al. |
| 6,167,517 A | 12/2000 | Gilchrist et al. |
| 6,192,142 B1 | 2/2001 | Pare, Jr. et al. |
| 6,243,689 B1 | 6/2001 | Norton |
| 6,310,966 B1 | 10/2001 | Dulude et al. |
| 6,532,541 B1 | 3/2003 | Chang et al. |
| 6,705,520 B1 | 3/2004 | Pitroda et al. |
| 6,738,749 B1 | 5/2004 | Chasko |
| 6,760,841 B1 | 7/2004 | Fernandez |

(Continued)

FOREIGN PATENT DOCUMENTS

| | | |
|---|---|---|
| AU | 2017228647 A1 | 10/2017 |
| CA | 2 906 524 A1 | 9/2014 |

(Continued)

OTHER PUBLICATIONS

English-language translation of Decision to Grant a Patent for Japanese Patent Application No. 2016-561596, dated Jan. 18, 2019.

(Continued)

*Primary Examiner* — Oluseye Iwarere
(74) *Attorney, Agent, or Firm* — Lee & Hayes, P.C.

(57) ABSTRACT

Temporarily provisioning card on file payment functionality to proximate merchants is described herein. A point-of-sale (POS) application executable by a POS device associated with a merchant can store an identifier associated with payment data corresponding to a payment instrument of a customer for use in future transactions with the customer. A payment processing service can determine other merchant(s) that subscribe to services of the payment processing service are participating in an event with the merchant and can receive a request to provision the payment data to the other merchant(s) to enable the other merchant(s) to use the identifier to complete transaction(s) with the customer without requiring the customer to present the payment instrument in association with the transaction(s). The payment processing service can provision the identifier to other POS device(s) of the other merchant(s) for temporarily storing the identifier on individual POS devices of the other POS device(s).

20 Claims, 10 Drawing Sheets

(56) References Cited

U.S. PATENT DOCUMENTS

| | | | |
|---|---|---|---|
| 6,763,399 B2 | 7/2004 | Margalit et al. | |
| 7,020,778 B1 | 3/2006 | Miettinen et al. | |
| 7,069,240 B2 | 6/2006 | Spero et al. | |
| 7,249,092 B2* | 7/2007 | Dunn | G06Q 20/04 |
| | | | 705/38 |
| 7,305,129 B2 | 12/2007 | Chellapilla et al. | |
| 7,949,609 B2 | 5/2011 | Colella | |
| 8,135,624 B1 | 3/2012 | Ramalingam et al. | |
| 8,498,900 B1 | 7/2013 | Spirin et al. | |
| 8,645,222 B1 | 2/2014 | Tamassia et al. | |
| 8,769,556 B2 | 7/2014 | Guo et al. | |
| 8,924,259 B2 | 12/2014 | Neighman et al. | |
| 9,037,491 B1 | 5/2015 | Lee | |
| 9,292,852 B2* | 3/2016 | Coulter | G06Q 20/10 |
| 9,519,901 B1 | 12/2016 | Dorogusker | |
| 9,576,159 B1* | 2/2017 | Templeton | G06K 7/0004 |
| 9,622,074 B2 | 4/2017 | Lee | |
| 9,626,669 B2 | 4/2017 | Lee | |
| 9,721,123 B1* | 8/2017 | Wade | G06Q 20/341 |
| 9,741,026 B1 | 8/2017 | Grassadonia et al. | |
| 9,754,255 B1 | 9/2017 | Ma et al. | |
| 9,760,883 B1* | 9/2017 | Wade | G06Q 20/3278 |
| 10,062,074 B1* | 8/2018 | Zigoris | G06Q 20/3567 |
| 10,147,076 B2 | 12/2018 | Zhou et al. | |
| 10,163,092 B2* | 12/2018 | Barrett | G06Q 20/28 |
| 10,182,328 B1* | 1/2019 | Maibach | H04W 52/0225 |
| 10,242,357 B1* | 3/2019 | Dorogusker | G06Q 20/204 |
| 10,318,952 B1* | 6/2019 | Wade | G06Q 20/341 |
| 10,373,184 B1* | 8/2019 | Kim | G06Q 30/0222 |
| 10,373,186 B1* | 8/2019 | Kim | G06Q 30/0215 |
| 10,552,841 B1* | 2/2020 | Dixit | G06Q 20/4093 |
| 10,572,868 B2* | 2/2020 | Barrett | G06Q 20/28 |
| 10,607,231 B1* | 3/2020 | Cohn | G06Q 20/409 |
| 10,740,748 B2 | 8/2020 | Zigoris | |
| 10,878,402 B1 | 12/2020 | Blackie et al. | |
| 2002/0152180 A1* | 10/2002 | Turgeon | G06Q 20/4012 |
| | | | 705/72 |
| 2003/0208386 A1 | 11/2003 | Brondrup | |
| 2003/0212609 A1 | 11/2003 | Blair et al. | |
| 2004/0029569 A1 | 2/2004 | Khan et al. | |
| 2004/0039694 A1* | 2/2004 | Dunn | G06Q 40/02 |
| | | | 705/39 |
| 2004/0059924 A1 | 3/2004 | Soto et al. | |
| 2004/0143527 A1* | 7/2004 | Benkert | G06Q 20/04 |
| | | | 705/35 |
| 2006/0047576 A1 | 3/2006 | Aaltonen et al. | |
| 2006/0206506 A1* | 9/2006 | Fitzpatrick | G06Q 20/12 |
| 2006/0265602 A1 | 11/2006 | Robinson | |
| 2007/0069013 A1 | 3/2007 | Seifert et al. | |
| 2008/0040233 A1 | 2/2008 | Wildman et al. | |
| 2008/0041937 A1 | 2/2008 | Vawter | |
| 2008/0046366 A1 | 2/2008 | Bemmel et al. | |
| 2008/0126260 A1 | 5/2008 | Cox et al. | |
| 2008/0167961 A1 | 7/2008 | Wentker et al. | |
| 2008/0189214 A1 | 8/2008 | Mueller et al. | |
| 2008/0215475 A1 | 9/2008 | Ramer et al. | |
| 2008/0300055 A1 | 12/2008 | Lutnick et al. | |
| 2008/0319869 A1 | 12/2008 | Carlson et al. | |
| 2009/0043696 A1 | 2/2009 | Ornce et al. | |
| 2009/0065571 A1 | 3/2009 | Jain | |
| 2009/0157547 A1 | 6/2009 | Ruckart | |
| 2009/0159663 A1 | 6/2009 | Mullen et al. | |
| 2009/0187466 A1 | 7/2009 | Carter et al. | |
| 2009/0187488 A1 | 7/2009 | Shamilian | |
| 2009/0187492 A1 | 7/2009 | Hammad et al. | |
| 2009/0228325 A1 | 9/2009 | Simmons et al. | |
| 2009/0307140 A1 | 12/2009 | Mardikar | |
| 2009/0313101 A1 | 12/2009 | McKenna et al. | |
| 2009/0327135 A1 | 12/2009 | Nguyen et al. | |
| 2010/0019033 A1 | 1/2010 | Jolivet | |
| 2010/0030651 A1 | 2/2010 | Matotek et al. | |
| 2010/0082445 A1 | 4/2010 | Hodge et al. | |
| 2010/0138344 A1 | 6/2010 | Wong et al. | |
| 2010/0169179 A1 | 7/2010 | Ramer et al. | |
| 2010/0191551 A1 | 7/2010 | Drance et al. | |
| 2010/0293065 A1 | 11/2010 | Brody et al. | |
| 2011/0184822 A1 | 7/2011 | Matkovic | |
| 2011/0307342 A1 | 12/2011 | Haji | |
| 2012/0010938 A1 | 1/2012 | Standley et al. | |
| 2012/0048922 A1 | 3/2012 | Godager | |
| 2012/0109818 A1* | 5/2012 | Carlson | G06Q 20/3672 |
| | | | 705/39 |
| 2012/0143707 A1 | 6/2012 | Jain | |
| 2012/0158580 A1 | 6/2012 | Eram et al. | |
| 2012/0197743 A1 | 8/2012 | Grigg et al. | |
| 2012/0253852 A1 | 10/2012 | Pourfallah et al. | |
| 2012/0290421 A1 | 11/2012 | Qawami et al. | |
| 2012/0331134 A1 | 12/2012 | Lynn et al. | |
| 2013/0132274 A1 | 5/2013 | Henderson et al. | |
| 2013/0173475 A1 | 7/2013 | Lund | |
| 2013/0198076 A1 | 8/2013 | Zambelli Hosmer et al. | |
| 2013/0218721 A1 | 8/2013 | Borhan et al. | |
| 2013/0232073 A1 | 9/2013 | Sheets et al. | |
| 2013/0267200 A1 | 10/2013 | Weiner et al. | |
| 2014/0058858 A1* | 2/2014 | Stecewycz | G06Q 20/409 |
| | | | 705/17 |
| 2014/0058862 A1 | 2/2014 | Celkonas | |
| 2014/0058865 A1 | 2/2014 | Yang et al. | |
| 2014/0188586 A1* | 7/2014 | Carpenter | G06Q 20/02 |
| | | | 705/14.23 |
| 2014/0222596 A1 | 8/2014 | S | |
| 2015/0081556 A1 | 3/2015 | Neighman et al. | |
| 2015/0088750 A1 | 3/2015 | Dua | |
| 2015/0088755 A1 | 3/2015 | Sobel et al. | |
| 2015/0120557 A1 | 4/2015 | Zhang | |
| 2015/0154588 A1* | 6/2015 | Purves | G06Q 30/0641 |
| | | | 705/14.27 |
| 2015/0161597 A1* | 6/2015 | Subramanian | G06Q 20/0855 |
| | | | 705/41 |
| 2015/0310412 A1 | 10/2015 | Calderon et al. | |
| 2015/0317638 A1 | 11/2015 | Donaldson | |
| 2016/0005020 A1* | 1/2016 | Fernando | G07G 1/14 |
| | | | 705/21 |
| 2016/0048821 A1 | 2/2016 | Sprecher | |
| 2016/0080941 A1 | 3/2016 | Jakobsson et al. | |
| 2016/0125415 A1 | 5/2016 | Mardikar et al. | |
| 2016/0125416 A1 | 5/2016 | Spencer et al. | |
| 2016/0140539 A1 | 5/2016 | Ma et al. | |
| 2016/0210626 A1 | 7/2016 | Ortiz et al. | |
| 2016/0217279 A1 | 7/2016 | Scully-Power et al. | |
| 2016/0314465 A1 | 10/2016 | Martin | |
| 2016/0364730 A1 | 12/2016 | Rans et al. | |
| 2016/0379205 A1 | 12/2016 | Margadoudakis | |
| 2017/0017958 A1 | 1/2017 | Scott et al. | |
| 2017/0046679 A1 | 2/2017 | Gotlieb et al. | |
| 2017/0061405 A1 | 3/2017 | Bryant | |
| 2017/0161733 A1* | 6/2017 | Koletsky | G06Q 20/3829 |
| 2018/0082319 A1* | 3/2018 | Wen | G06Q 40/025 |
| 2018/0150846 A1 | 5/2018 | Maheshwari et al. | |
| 2018/0253727 A1 | 9/2018 | Ortiz et al. | |
| 2018/0293562 A1 | 10/2018 | Squire et al. | |
| 2018/0293573 A1 | 10/2018 | Ortiz et al. | |
| 2019/0057377 A1* | 2/2019 | Zigoris | G06Q 20/3567 |
| 2019/0318355 A1* | 10/2019 | Chopra | G06Q 20/401 |
| 2019/0354981 A1 | 11/2019 | Neighman et al. | |

FOREIGN PATENT DOCUMENTS

| | | |
|---|---|---|
| EP | 1 764 680 A2 | 3/2007 |
| JP | 2002-99858 A | 4/2002 |
| JP | 2003-150885 A | 5/2003 |
| JP | 2005-321873 A | 11/2005 |
| JP | 2009-86832 A | 4/2009 |
| JP | 2009-226689 A | 10/2009 |
| JP | 2011-197511 A | 10/2011 |
| JP | 2013-97657 A | 5/2013 |
| JP | 2013-238977 A | 11/2013 |
| JP | 2017-510903 A | 4/2017 |
| KR | 10-2011-0019887 A | 3/2011 |
| KR | 10-2012-0074497 A | 7/2012 |
| KR | 10-2012-0133706 A | 12/2012 |

(56) References Cited

FOREIGN PATENT DOCUMENTS

| WO | 2011/156884 A1 | 12/2011 |
|---|---|---|
| WO | 2014/151582 A1 | 9/2014 |
| WO | 2015/100385 A1 | 7/2015 |

OTHER PUBLICATIONS

Notice of Allowance for Canadian Patent Application No. 2,935,177, dated Jan. 22, 2019.
Final Office Action dated Mar. 7, 2019, for U.S. Appl. No. 15/339,744, of Dorogusker, J., filed Oct. 31, 2016.
Second Examination Report for Australian Patent Application No. 2017228647, dated Mar. 12, 2019.
Advisory Action dated Mar. 21, 2019, for U.S. Appl. No. 14/984,931, of Dorogusker, J., filed Dec. 30, 2015.
Third Examination Report for Australian Patent Application No. 2017228647, dated Apr. 18, 2019.
Notice of Allowance dated Apr. 24, 2019, for U.S. Appl. No. 14/550,382, of Neighman, D., et al., filed Nov. 21, 2014.
Non-Final Office Action dated Jun. 3, 2019, for U.S. Appl. No. 14/984,931, of Dorogusker, J., filed Dec. 30, 2015.
Non-Final Office Action dated Jun. 27, 2019, for U.S. Appl. No. 15/675,099, of Grassadonia, B., filed Aug. 11, 2017.
International Search Report and Written Opinion in International Patent Application No. PCT/US2014/026038, dated Jul. 7, 2014.
International Search Report and Written Opinion for International Patent Application No. PCT/US2014/072285, dated Mar. 31, 2015.
Extended European Search Report for European Patent Application No. 14875157.1, dated Jul. 14, 2017.
English translation of Search Report for Japanese Patent Application No. 2016-561596, dated Sep. 7, 2017.
Non-Final Office Action dated Jan. 8, 2020, for U.S. Appl. No. 15/339,744, of Dorogusker, J., filed Oct. 31, 2016.
Non-Final Office Action dated Jan. 16, 2020, for U.S. Appl. No. 14/984,931, of Dorogusker, J., filed Dec. 30, 2015.
Non-Final Office Action dated Feb. 14, 2020, for U.S. Appl. No. 15/675,099, of Grassadonia, B., et al., filed Aug. 11, 2017.
Notice of Allowance dated Mar. 18, 2020, for U.S. Appl. No. 16/111,026, of Zigoris, P., filed Aug. 23, 2018.
Final Office Action dated Sep. 9, 2019, for U.S. Appl. No. 14/984,931, of Dorogusker, J., filed Dec. 30, 2015.
European Search Report dated Sep. 20, 2019, in European Patent Application No. 14 875 157.1, of Lee, R., filed Dec. 23, 2014.
Non-Final Office Action dated Oct. 21, 2019, for U.S. Appl. No. 16/111,026, of Zigoris, P., filed Aug. 23, 2018.
First Examination Report for Australian Patent Application No. 2019240563, dated Nov. 22, 2019.
"Card Reader," FullContact Developer API, last modified on Jun. 14, 2013, Retrieved from the Internet URL: https://web.archive.org/web/20130615043655/http://www.fullcontact.com/developer/docs/card-reader, on Sep. 29, 2015, pp. 1-8.
"Secure Code FAQs," BankSA, Retrieved from the Internet URL: http://web.archive.org/web/20121005105958/https://www.banksa.com.au/online-services/security-centre/we-protect-you/banksa-secure/secure-code-faqs, on Oct. 5, 2012, p. 1.
"Square- Pay-by-Name," Pay with your phone! Square Card case frees you of credit cards, Youtube.com, Retrieved from the Internet URL: https://www.youtube.com/watch?v=d3CYigOjx8o, Posted on Sep. 7, 2011, AppJudgment, pp. 1-15.
Friedman, T.D., "The Authorization Problem in Shared Files," IBM Systems Journal, vol. 9, Issue 4, Dec. 1970, pp. 258-280.
Goode, L., "Paying With Square's New Mobile-Payments App," All Things D, Apr. 30, 2012, Retrieved from the Internet URL: http://allthingsd.com/20120430/paying-with-squares-new-mobile-payments-app/, pp. 1-6.
Grove, V. J., "How Square's New Pay-With-Your-Name System Works," Mashable, May 23, 2011, Retrieved from the Internet URL: http://mashable.com/2011/05/23/square-card-case/#_ , on Sep. 10, 2014, pp. 1-17.
Grove, V. J., "Square Announces New Consumer Initiative: Pay with your name," Mashable, May 23, 2011, Retrieved from the Internet URL: http://mashable.com/2011/05/23/square-pay-with-name/, on Sep. 10, 2014, pp. 1-23.
Morrow, S. E., "Pay-by-name purchasing: changing the future of spending," Kmov.comSt.Louis, Dec. 29, 2011, Retrieved from the Internet URL: http://www.kmov.com/news/technology/Pay-by-name-purchasing-changing-the-future-of-spending-136411238.html, on Sep. 10, 2014, pp. 1-5.
Roland, M., "Software Card Emulation in NFC-enabled Mobile Phones: Great Advantage or Security Nightmare?," Fourth International Workshop on Security and Privacy in Spontaneous Interaction and Mobile Phone Use (IWSSI/SPMU), Newcastle, UK, Jun. 18, 2012, pp. 1-6.
Schneier, B., "Protocol Building Blocks," in Applied Cryptography—Second Edition—Protocols, Algorithms and Source Code in C, Chapter-2, pp. 37-38, Phil Sutherland, Katherine Schowalter (1996).
Non Final Office Action dated Feb. 26, 2014, for U.S. Appl. No. 13/831,103, of Neighman, D., et al., filed Mar. 14, 2013.
Non-Final Office Action dated Jul. 10, 2014, for U.S. Appl. No. 14/187,049, of Lee, R., filed Feb. 21, 2014.
Final Office Action dated Sep. 25, 2014, for U.S. Appl. No. 14/187,049, of Lee, R., filed Feb. 21, 2014.
Advisory Action dated Oct. 17, 2014, for U.S. Appl. No. 14/187,049, of Lee, R., filed Feb. 21, 2014.
Notice of Allowance dated Oct. 20, 2014, for U.S. Appl. No. 13/831,103, of Neighman, D., etal., filed Mar. 14, 2013.
Notice of Allowance dated Feb. 27, 2015, for U.S. Appl. No. 14/187,049, of Lee, R., filed Feb. 21, 2014.
Non-Final Office Action dated May 18, 2015, for U.S. Appl. No. 14/667,496, of Lee, R., filed Mar. 24, 2015.
Final Office Action dated Aug. 21, 2015, for U.S. Appl. No. 14/667,496, of Lee, R., filed Mar. 24, 2015.
Advisory Action dated Oct. 8, 2015, for U.S. Appl. No. 14/667,496, of Lee, R., filed Mar. 24, 2015.
Non-Final Office Action dated Feb. 5, 2016, for U.S. Appl. No. 14/667,496, of Lee, R., filed Mar. 24, 2015.
Non-Final Office Action dated Jun. 1, 2016, for U.S. Appl. No. 14/667,496, of Lee, R., filed Mar. 24, 2015.
Non-Final Office Action dated Jun. 16, 2016, for U.S. Appl. No. 14/502,703, of Grassadonia, B., et al., filed Sep. 30, 2014.
Notice of Allowance dated Aug. 18, 2016, for U.S. Appl. No. 14/985,130, of Dorogusker, J., filed Dec. 30, 2015.
Examination Report No. 1 for Australian Patent Application No. 2014233712, dated Sep. 15, 2016.
Examination Report No. 1 for Australian Patent Application No. 2014369891, dated Nov. 3, 2016.
Examiner Requisiton for Canadian Patent Application No. 2,906,524, dated Nov. 4, 2016.
Notice of Allowance dated Dec. 9, 2016, for U.S. Appl. No. 14/667,496, of Lee, R., filed Mar. 24, 2015.
Final Office Action dated Dec. 29, 2016, for U.S. Appl. No. 14/502,703, of Grassadonia, B., et al., filed Sep. 30, 2014.
Notice of Acceptance for Australian Patent Application No. 2014369891, dated Feb. 21, 2017.
Non Final Office Action dated Mar. 9, 2017, for U.S. Appl. No. 15/339,744, of Dorogusker, J., filed Oct. 31, 2016.
Examiner Requisition for Canadian Patent Application No. 2,935,177, dated Apr. 7, 2017.
Notice of Allowance dated Apr. 20, 2017, for U.S. Appl. No. 14/502,703, of Grassadonia, B., et al., filed Sep. 30, 2014.
Non-Final Office Action dated Jul. 3, 2017, for U.S. Appl. No. 15/365,637, of Zigoris, P., filed Nov. 30, 2016.
Final Office Action dated Aug. 17, 2017, for U.S. Appl. No. 15/339,744, of Dorogusker, J., filed Oct. 31, 2016.
English translation of Notification of Reasons for Refusal for Japanese Patent Application No. 2016-561596, dated Oct. 13, 2017.
Advisory Action dated Oct. 31, 2017, for U.S. Appl. No. 15/339,744, of Dorogusker, J., filed Oct. 31, 2016.
Notice of Allowance for Canadian Patent Application No. 2906524, dated Nov. 16, 2017.
Final Office Action dated Jan. 4, 2018, for U.S. Appl. No. 15/365,637, of Zigoris, P., filed Nov. 30, 2016.

(56) References Cited

OTHER PUBLICATIONS

Non-Final Office Action dated Jan. 25, 2018, for U.S. Appl. No. 14/550,382, of Neighman, D., et al., filed Nov. 21, 2014.
Examiner Requisition for Canadian Patent Application No. 2,935,177, dated Feb. 28, 2018.
Advisory Action dated Apr. 9, 2018, for U.S. Appl. No. 15/365,637, of Zigoris, P., filed Nov. 30, 2016.
Notice of Allowance dated Apr. 23, 2018, for U.S. Appl. No. 15/365,637, of Zigoris, P., filed Nov. 30, 2016.
Non Final Office Action dated Jun. 1, 2018, for U.S. Appl. No. 15/339,744, of Dorogusker, J., filed Oct. 31, 2016.
Final Office Action dated Aug. 7, 2018, for U.S. Appl. No. 14/550,382, of Neighman, D., et al., filed Nov. 21, 2014.
Non-Final Office Action dated Aug. 13, 2018, for U.S. Appl. No. 14/984,931, of Dorogusker, J., filed Dec. 30, 2015.
Examination Report No. 1 for Australian Patent Application No. 2017228647, dated Sep. 28, 2018.
English translation of Notification of Reasons for Refusal for Japanese Patent Application No. 2016-561596, dated Oct. 5, 2018.
Advisory Action dated Nov. 15, 2018, for U.S. Appl. No. 14/550,382, of Neighman, D., et al., filed Nov. 21, 2014.
Final Office Action dated Dec. 14, 2018, for U.S. Appl. No. 14/984,931, of Dorogusker, J., filed Dec. 30, 2015.
Non Final Office Action dated Jan. 2, 2019, for U.S. Appl. No. 14/550,382, of Neighman, D., et al., filed Nov. 21, 2014.
Final Office Action dated Jul. 24, 2020, for U.S. Appl. No. 15/339,744, of Dorogusker, J., filed Oct. 31, 2016.
Final Office Action dated Aug. 19, 2020, for U.S. Appl. No. 14/984,931, of Dorogusker, J., filed Dec. 30, 2015.
Final Office Action dated Aug. 21, 2020, for U.S. Appl. No. 15/675,099, of Grassadonia, B., et al., filed Aug. 11, 2017.
Notice of Allowance dated Sep. 2, 2020, U.S. Appl. No. 16/120,095, of Blackie, S., et al., filed Aug. 31, 2018.
"Application programming interface—Wikipedia", XP055671378, Retrieved from the Internet URL: https://en.wikipedia.org/w/index.php?title=Application_programming_interface&oldid=587766714#API_and_protocols, on Jun. 26, 2020, pp. 1-8.
Non-Final Office Action dated Jul. 9, 2020, U.S. Appl. No. 16/120,095, of Blackie, S., et al., filed Aug. 31, 2018.
Summons to Attend Oral Proceedings for European Patent Application No. 14 875 157.1, mailed Jun. 24, 2020.
Examination Report No. 2 for Australian Patent Application No. 2019240563, dated Jul. 13, 2020.

* cited by examiner

TEMPORARILY PROVISIONING CARD ON FILE PAYMENT FUNCTIONALITY TO PROXIMATE MERCHANTS

BACKGROUND

In payment processing, a consumer can store credit card credentials within a merchant database or another secure server accessed by a merchant via "card on file" functionality. This allows customers to make purchases without the need to enter and re-enter their credit card credentials each time they make a payment with the particular merchant. A primary benefit of offering this option to customers is for convenience and ease-of-use for both customers and merchants.

Events (e.g., music festivals, antique shows, conventions, etc.) bring together multiple merchants in a particular location. For instance, with music festivals there are merchants selling artist merchandise, merchants selling food, merchants selling beverages, etc. Events can be crowded, and, with increased security, attendees often minimize the number and size of items they bring to such events. Further, lines at events can be long due to slow payment processing options. Moreover, wallet thefts and other security issues are on the rise.

BRIEF DESCRIPTION OF THE DRAWINGS

The above and other features of the present disclosure, its nature and various advantages, will be more apparent upon consideration of the following detailed description, taken in conjunction with the accompanying drawings in which.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
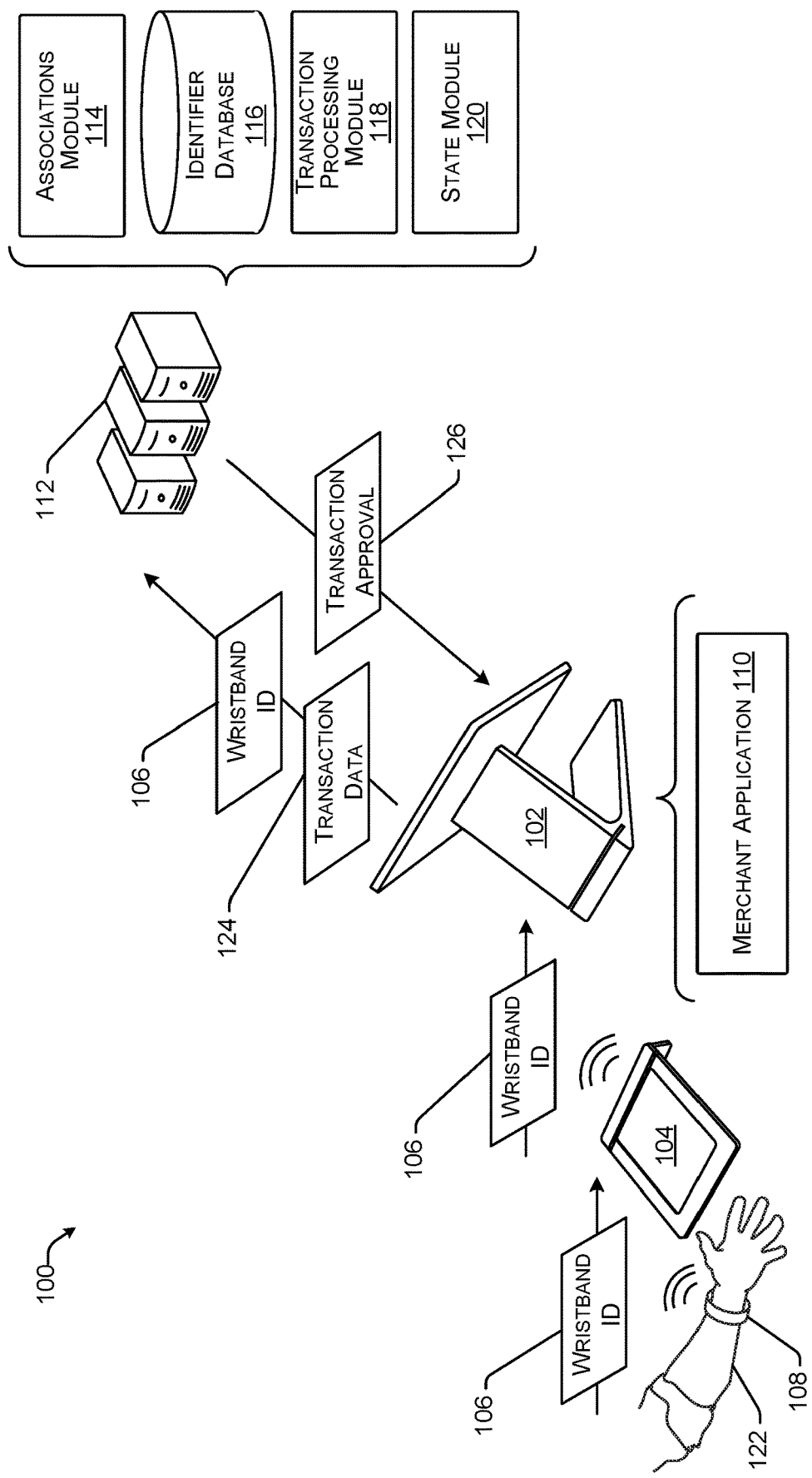
FIG. 1 illustrates an example system for temporarily associating a payment object with payment data associated with a payment instrument as described herein.

Techniques described herein are directed to temporarily provisioning card on file payment functionality to alternate payment objects and/or proximate merchants, for instance in association with events involving multiple merchants. Events, such as music festivals, antique shows, conventions, etc. bring together multiple merchants in a particular location. For instance, with music festivals there are merchants selling artist merchandise, merchants selling food, merchants selling beverages, etc. Techniques described herein are directed to extending card on file functionality at events so that customers can make payments at various merchants participating in the events without having to present a payment instrument for each transaction.

Many events use wristbands for identifying event attendees (e.g., for admission, security, etc.). In at least one example, wristbands can be enabled with radio-frequency identification (RFID) technology. Techniques described herein are directed to extending card on file functionality to RFID-enabled wristbands so that customers can make payments at various merchants participating in an event without having to present a payment instrument for each transaction. That is, in at least one example a RFID-wristband can be linked to a payment instrument (e.g., a credit card, a debit card, a gift card, an account, etc.), such that when the RFID-enabled wristband interacts with a reader device, the reader device can read an identifier associated with the RFID-enabled wristband for processing payment. In some examples, a customer can link a RFID-enabled wristband with a payment instrument prior to attending an event (e.g., during checkout of buying tickets for the event, registration for the event, etc.). In other examples, a customer can link a RFID-enabled wristband at the event, for instance in association with a transaction. In at least one example, a customer can provide a payment instrument as payment for a transaction with a merchant. A reader device can read payment data associated with the payment instrument and send the payment data to a payment processing service. The payment processing service can determine that the payment data is not linked to a RFID-enabled wristband identifier. As such, the payment processing service can prompt the customer to link the customer's payment instrument with the customer's RFID-enabled wristband so that the customer can use the RIFD-enabled wristband for transacting with merchants during the event. Based on the customer linking the RFID-enabled wristband with the payment instrument, the customer can transact with other merchants at the event without needing to bring the payment instrument. As the customer transacts with merchants using the RFID-enabled wristband, charges are made to the customer's credit card or amounts of funds are withdrawn from an account associated with a debit card, for example.

After a payment instrument and RFID-enabled wristband are linked, when a customer transacts with a merchant, the customer can tap the RFID-enabled wristband to a reader device associated with the merchant. That is, the reader device can be configured to obtain information (e.g., an identifier) from the RFID-enabled wristband via RFID communication when the RFID-enabled wristband is placed within a threshold distance of the reader device (e.g., in a process similar to contactless payments). The reader device can read an identifier associated with the RFID-enabled wristband and can send the identifier to the payment processing service. The payment processing service can determine that the identifier is associated with the payment instrument and can use the payment data associated with the payment instrument to process the transaction. That is, the payment processing service can charge the payment instrument for an amount of the transaction or withdraw funds associated with the amount of the transaction from an account associated with the payment instrument at or near the time of the transaction (or when an offline point-of-sale (POS) device returns online).

In some examples, the customer can link the RFID-enabled wristband and the payment instrument and may use the payment instrument instead of the RFID-enabled wristband. If the customer uses the payment instrument as payment for a transaction after the payment instrument has been linked to the RFID-enabled wristband, the reader device can read payment data associated with the payment instrument and can send the payment data to the payment processing service. The payment processing service can determine that the payment data is associated with an identifier and can prompt the customer to use the RIFD-enabled wristband device for future transactions.

In some examples, a customer might observe other customers using their RFID-enabled wristband for transacting with merchants at an event. Accordingly, the customer may tap the customer's RIFD-enabled wristband on the reader device. In such an example, or others, the reader device can read the identifier associated with the RFID-enabled wristband and can send the identifier to the payment processing service. The payment processing service can determine that the identifier is not linked to a payment instrument. As such, the payment processing service can prompt the customer to link the customer's payment instrument with the customer's RFID-enabled wristband so that the customer can use the RIFD-enabled wristband for transacting with merchants during the event.

While the techniques described above are directed to linking an RFID-enabled wristband and a payment instrument, any alternate payment object can be linked to a payment instrument. For instance, in at least one example, an RFID-enabled card (e.g., a hotel key card, etc.) can be linked to a payment instrument. Further, while techniques described herein are directed to RFID-enabled objects, any other technology that can electronically store information in association with an object can be used consistent with techniques described herein.

As described above, techniques described herein are directed to extending card on file functionality to RFID-enabled wristbands so that customers can make payments at various merchants participating in an event without having to present a payment instrument for each transaction. Further, techniques described herein are directed to extending card on file functionality to multiple merchants participating in an event so that customers can make payments at various merchants at an event without having to present a payment instrument for each transaction (e.g., for an event where RIFD-enabled wristbands are not available and/or used). In at least one example, a customer can authorize the customer's payment instrument (e.g., payment data associated therewith) to be stored on file for one or more merchants participating in an event. For instance, a customer can provide an indication that the customer desires to share the customer's payment data (or a personal identifier associated therewith) with one or more merchants participating in an event, and the payment processing service can temporarily provision the payment data (or the personal identifier associated therewith) to the one or more merchants. As such, the customer can make payments to various merchants at the event without having to present a payment instrument for each transaction.

Card on file functionality is particularly beneficial to customers that frequently visit a merchant. The frequency and strength of the relationship between regular customers and the merchant establish a level of trust between such regular customers and the merchant. However, in scenarios such as those described herein (e.g., where a customer and merchant are at an event), a customer may not know or otherwise be familiar with other merchants participating in the event, and vice versa. Accordingly, in some examples, a customer can provide a personal identifier (e.g., a PIN, an image, an email address, a phone number, a personalized logo, a personalized phrase, a personalized code, etc.) to be associated with their payment data that is stored on file. In such examples, the payment processing service can provision the personal identifier to the merchants participating in the event so that the payment data is securely stored at the payment processing service and the personal identifier is used to reference the payment data. Responsive to receiving the personal identifier in association with a transaction, the payment processing service can access the payment data associated with the personal identifier and can use the payment data for processing the transaction. That is, the customer can make payments to various merchants at the event using the identifier, without having to present a payment instrument for each transaction.

It should be noted that the card on file extensions described herein can be temporarily enabled. That is, in at least one example, extending card on file functionality using RFID-enabled wristbands and/or to proximately located merchants can be temporally and/or geographically limited such that the card on file functionality is available for the duration of the event, while participating merchants and/or customers are in a geographic location corresponding to the event (e.g., a geofence associated with the event). Furthermore, techniques described herein are directed to de-provisioning extended card on file functionality based on such temporal and/or geographic limitations, or an express indication to de-provision such functionality (e.g., for security purposes).

As described above, techniques described herein are directed to extending card on file functionality so that customers can make payments at various merchants at an event. Techniques described herein enable event attendees to minimize the number and size of items they bring to such events. Furthermore, techniques described herein increase the efficiency within which transactions are processed, thereby reducing lines and/or increasing the speed at which customers move through lines at such events. Moreover, techniques described herein can mitigate wallet thefts and other security issues that are currently on the rise. As such, techniques described herein are directed to unconventional systems, methods, etc. that alleviate the inconveniences and concerns described above.

Furthermore, techniques described herein are directed to improvements to point-of-sale (POS) technology. For instance, techniques described herein are directed to improvements to the reader device as card on file extensions described herein alter the standard payment flow. That is, by using a RFID-enabled wristband identifier and/or extended card on file functionality, the reader device need not read and transmit payment data to the payment processing service.

Accordingly, techniques described herein are directed to unconventional techniques for reducing network congestion and increasing bandwidth.

FIG. 1 illustrates an example system 100 for temporarily associating a payment object with payment data associated with a payment instrument as described herein. The example system 100 includes a merchant device 102, which can be associated with a reader device 104. The merchant device 102 and the reader device 104 can comprise a POS device, which can be operable by a merchant offering items (e.g., goods, services, etc.) for acquisition (e.g., purchase, rent, trade, borrow, etc.) at a point-of-sale. In at least one example, the reader device 104 can be configured to read payment data and identifiers (e.g., wristband identifier 106 associated with wristband 108), as described below. In FIG. 1, a wristband 108 is illustrated, but any payment object can be used.

In at least one example, the merchant device 102 can include an instance of a merchant application 110. The merchant application 110 can provide POS functionality to the merchant device 102 to enable the merchant to accept payments from one or more customers at a POS location. For example, the merchant can use the merchant application 110 to accept payments through various different types of payment instruments, e.g., payment cards, electronic payment, cash or check, cryptocurrency, etc. at the POS location from the one or more customers. In at least one example, the merchant application 110 can enable the merchant to accept payments via identifiers associated with payment objects, such as the wristband identifier 106 described above. For instance, the merchant application 110 can receive and/or transmit identifiers, such as the wristband identifier 106, to one or more servers 112 associated with a payment processing service.

Furthermore, the merchant application 110 can generate and/or transmit transaction data associated with transactions between the merchant and one or more customers. Transaction data can indicate user authentication data, purchase amount information, point-of-purchase information (e.g., identity of a merchant, an MCC, item(s) to be purchased), etc. Additional details associated with the merchant application 110 are described below.

In at least one example, the reader device 104 can be configured to read payment instruments. In at least one example, the reader device 104 can read payment data associated with the payment instrument and can transmit the payment data to the merchant application 110. The payment data can identify the payment instrument. For instance, the payment data can include, but is not limited to, a name of the customer, an address of the customer, a type (e.g., credit, debit, etc.) of a payment instrument from which the payment data is accessed, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration date associated with the payment instrument, a primary account number (PAN) corresponding to the customer (which may or may not match the number associated with the payment instrument), restrictions on what types of charges/debts may be made, etc. In some examples, the payment data may be encrypted. In at least one example, the merchant application 110 can transmit the payment data (or a portion thereof) to the server(s) 112. In at least one example, the payment data can be transmitted in association with transaction data associated with the transaction. That is, in at least one example, the merchant application 110 can transmit a request to authorize payment data associated with the identifier for a cost of the transaction to the server(s) 112.

The reader device 104 is shown in FIG. 1 as being a customer-facing device that is wirelessly connected to the merchant device 102; however, in alternate examples, the reader device 104 can plug in to a port in the merchant device 102, such as a microphone/headphone port, a data port, or other suitable port. The reader device 104 can include a read head for reading a magnetic strip of a payment card, and further can include encryption technology for encrypting the information read from the magnetic strip. Additionally or alternatively, the reader device 104 can be a Europay, MASTERCARD®, VISA® (EMV) payment reader, which in some examples can be embedded in the merchant device 102. In at least one example, the reader device 104 can be configured for reading identifiers, such as the wristband identifier 106. In at least one example, the wristband 108 can be enabled with RFID-enabled technology, or another technology that electronically stores information, as described above. As noted above, while FIG. 1 is described with a wristband, any other alternate payment object encoded with RFID, or similar, technology can also be used.

The server(s) 112 associated with the payment processing service can be configured to, among other things, process payments between merchants and customers. In at least one example, the server(s) 112 can include an associations module 114, an identifier database 116, a transactions processing module 118, and a state module 120. The associations module 114 can facilitate associating entities such as, but not limited to, identifiers (associated with payment objects) with payment data (associated with payment instruments). Resulting associations (e.g., mappings) can be stored in the identifier database 116. That is, the identifier database 116 can store associations between identifiers and payment data. Additional details associated with the associations module 114 are described below. The transaction processing module 118 can receive transaction data and process transactions based at least in part on the transaction data and payment data. Additional details associated with the transaction processing module 118 are described below. The state module 120 can determine when events occur (or conclude) and can activate (or deactivate) particular functionality associated with the merchant device 102 and/or customer device 104. Such functionality can enable the merchant device 102 and/or the reader device 104 to read, transmit, and/or receive identifiers (e.g., such as the wristband identifier 106) in addition to (or as an alternate of) payment data or obtain access to cards (or other payment instruments) stored on file with other merchants participating in events.

In at least one example, a customer 122 can be associated with a wristband 108 (e.g., which the customer can wear, carry, etc.). The wristband 108 can be associated with a wristband identifier 106. The wristband identifier 106 can be linked to a payment instrument of the customer 122. That is, the wristband identifier 106 can be mapped to, or otherwise associated with, payment data associated with a payment instrument of the customer 122. In some examples, the customer 122 can associate the payment data with the wristband identifier 106 prior to an event (e.g., during checkout for purchasing tickets to an event, during registration for an event, etc.) (e.g., via a web-portal, public API, etc.), at an event, in association with a transaction at an event, etc. Additional details are described below.

In at least one example, the customer 122 can participate in a transaction with the merchant associated with the merchant device 102 and the reader device 104. In at least one example, the merchant application 110 can determine transaction data 124 associated with the transaction, which can include, but is not limited to user authentication data, purchase amount information, point-of-purchase information (e.g., identity of a merchant, an MCC, item(s) to be purchased), etc. The merchant application 110 can transmit the transaction data 124 to the server(s) 112.

In at least one example, the customer 122 can facilitate an interaction (e.g., a tap) between the wristband 108 and the reader device 104 to provide payment associated with the transaction. The reader device 104 can obtain the wristband identifier 106 from the wristband 108 during the tap and can transmit the wristband identifier 106 to the merchant device 102. In some examples, the transaction data 124 and the wristband identifier 106 can be transmitted to the server(s) 106 at a same time. In other examples, the transaction data 124 and the wristband identifier 106 can be transmitted to the server(s) 106 at different times.

The transaction processing module 118 can receive the transaction data 124 and the wristband identifier 106. The transaction processing module 118 can access the identifier database 116 to determine whether the wristband identifier 106 is mapped to, or otherwise associated with, payment data associated with a payment instrument of the customer 122. Based at least in part on determining that the wristband identifier 106 is mapped to, or otherwise associated with, payment data, the transaction processing module 118 can process the transaction based at least in part on the transaction data 124 and the payment data associated with the wristband identifier 106. Based at least in part on determining that the payment instrument is authorized for the cost of the transaction, the transaction processing module 118 can send a notification that the transaction is approved (e.g., transaction approval 126) to the merchant device 102 (e.g., the merchant application 110).

In an alternate example, the transaction processing module 118 can determine that the wristband identifier 106 is not mapped to, or otherwise associated with, payment data in the identifier database 116. In such an example, the transaction processing module 118 can send a notification to the associations module 114. The associations module 114 can facilitate associating the wristband identifier 106 with payment data of a payment instrument of the customer so that the customer can use the wristband 108 for completing transactions instead of presenting a payment instrument. In some examples, such associations can be temporary such that upon the occurrence of a de-provisioning event, an association between a wristband identifier and payment data can be terminated. In such examples, the association can be terminated such that the customer 122 cannot use the wristband 108 instead of a payment instrument for completing transactions. Additional details associated with associating identifiers and payment data are described below. Furthermore, additional details associated with disassociating associations between identifiers and payment data are described below.

While FIG. 1 is described above with reference to a wristband 108 and a wristband identifier 106, in additional or alternate examples, any identifier associated with any payment object can be used as an alternate payment object for completing transactions with merchants.

FIGS. 2-5 are flow diagrams illustrating example processes according to some implementations. The processes of FIGS. 2-5 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 2-5 can be combined with some or all of the operations illustrated in others of FIGS. 2-5. For discussion purposes, the processes are described with reference to the environments, architectures and devices described in FIG. 1 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 2:
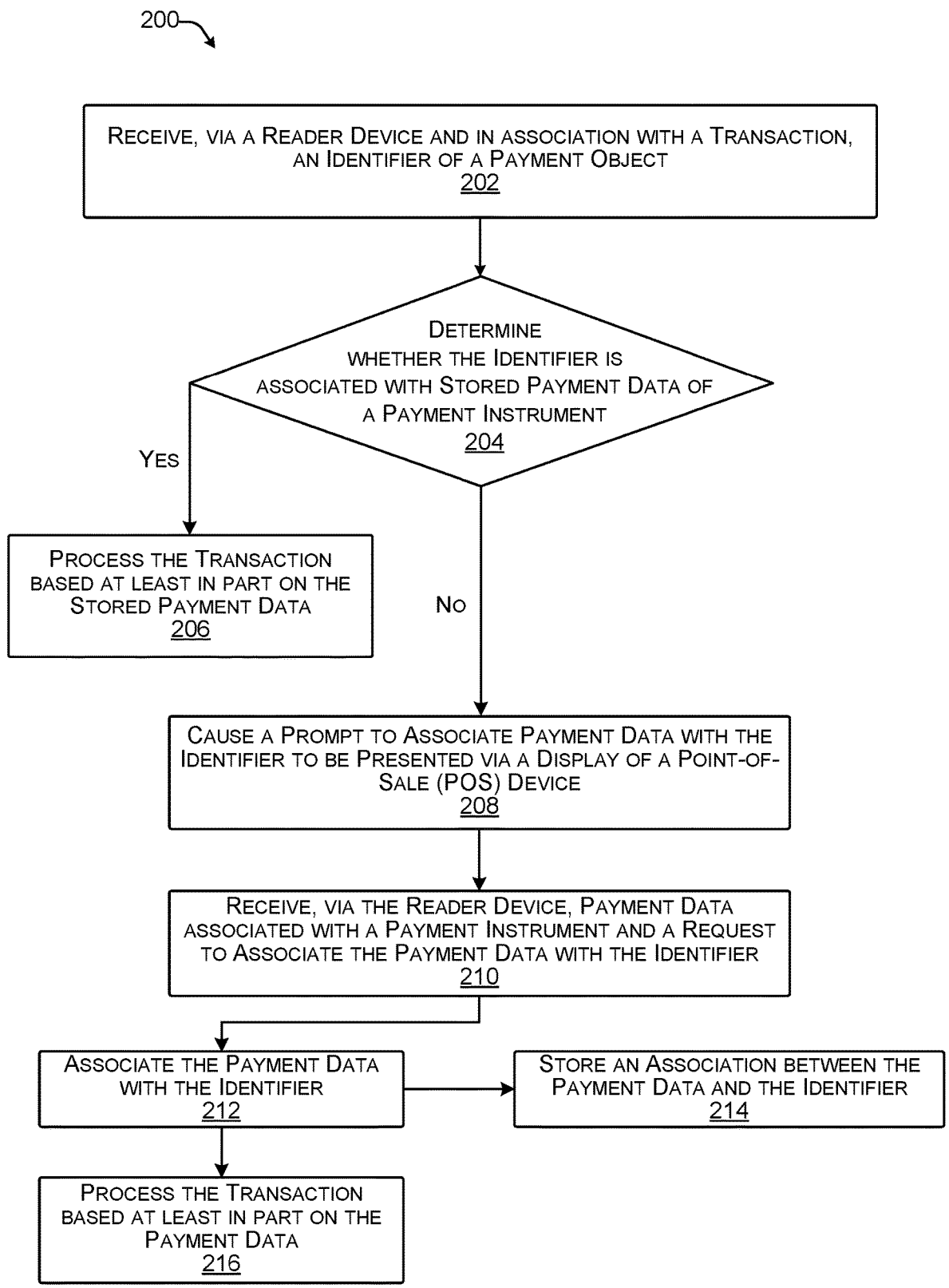
FIG. 2 illustrates an example process for temporarily associating a payment object with payment data associated with a payment instrument as described herein.

FIG. 2 illustrates an example process 200 for temporarily associating a payment object with payment data associated with a payment instrument as described herein.

Block 202 illustrates receiving, via a reader device and in association with a transaction, an identifier of a payment object. In at least one example, a customer can facilitate an interaction between a payment object, such as the wristband 108, of the customer and a reader device, such as the reader device 104, to provide payment for a transaction. For instance, the customer can tap the payment object to the reader device 104 to facilitate a contactless payment transaction. The reader device 104 can read the identifier associated with the payment object and can send the identifier to the merchant application 110, which can send the identifier to the transaction processing module 118. In some examples, the merchant application 110 can additionally send transaction data to the transaction processing module 118 in association with the identifier.

Block 204 illustrates determining whether the identifier is associated with stored payment data of a payment instrument. In at least one example, the transaction processing module 118 can receive the identifier and the transaction data, and the transaction processing module 118 can access the identifier database 116 to determine whether the identifier is associated with payment data. That is, the transaction processing module 118 can compare the identifier with one or more stored associations between identifiers and payment data (e.g., in the identifier database 116) to determine whether the identifier is mapped to, or otherwise associated with, payment data. Based at least in part on determining that the identifier is mapped to, or otherwise associated with, payment data, the transaction processing module 118 can process the transaction using the stored payment data, as illustrated in block 206 (and also described above with reference to FIG. 1).

Block 208 illustrates causing a prompt to associate payment data with the identifier to be presented via a display of a POS device. Based at least in part on determining that the identifier is not mapped to, or otherwise associated with, payment data, the transaction processing module 118 can notify the associations module 114. The associations module 114 can cause a prompt to be presented via the merchant device 102 and/or the reader device 104. That is, the associations module 114 can send a prompt to the merchant application 110, and the merchant application 110 can output the prompt. In at least one example, the prompt can query whether the customer desires to associate the identifier with payment data of a payment instrument. As a non-limiting example, the prompt can include a textual element such as "Do you want to associate your wristband with a payment instrument?" or "Present a payment instrument to associate with your wristband." In some examples, the prompt can be presented via a display of the merchant device 102 and/or the reader device 104. In additional or alternate examples, the prompt can be output via one or more speakers, or via another output device. Other output mechanisms are within the scope of this disclosure.

Block 210 illustrates receiving, via the reader device, payment data associated with a payment instrument and a request to associate the payment data with the identifier. In at least one example responsive to causing the prompt to be presented, the merchant application 110 can receive payment data associated with a payment instrument (e.g., via the reader device 104), and the merchant application 110 can send the payment data to the server(s) 112.

Block 212 illustrates associating the payment data with the identifier. The associations module 114 can receive the payment data and can map, or otherwise associate, the payment data with the identifier. In at least one example, the associations module 114 can store such an association (e.g., between the identifier and the payment data) in the identifier database 116, as illustrated in block 214.

Block 216 illustrates processing the transaction based at least in part on the payment data. Based at least in part on receiving the payment data, the transaction processing module 122 can process the transaction based on the payment data.

While process 200 is directed to associating an identifier of a payment object with payment data in association with a transaction, in alternate examples, a customer can associate the identifier with the payment data prior to conducting a transaction. For instance, in some examples, a customer can associate an identifier of a payment object with payment data in association with purchasing tickets for an event, registering for an event, etc. In such an example, the customer can provide payment data in association with purchasing tickets for an event, registering for an event, etc. and such payment data can be associated with an identifier of a payment object. In yet another example, a customer can associate payment data with an identifier at an event, prior to conducting a transaction. For instance, in at least one example, a customer can facilitate an interaction between a reader device and a payment object and can provide payment data associated with a payment instrument via the same reader device. In such an example, the customer can request that the payment data be associated with the identifier.

In some examples, more than one identifier can be associated with the same payment data. That is, in at least one example, two or more identifiers can be mapped to, or otherwise associated with, payment data of a same payment instrument. In such an example, multiple customers can utilize their individual wristbands to transact with one or more merchants and a single payment instrument can be used to settle each of the transactions.

Figure 3:
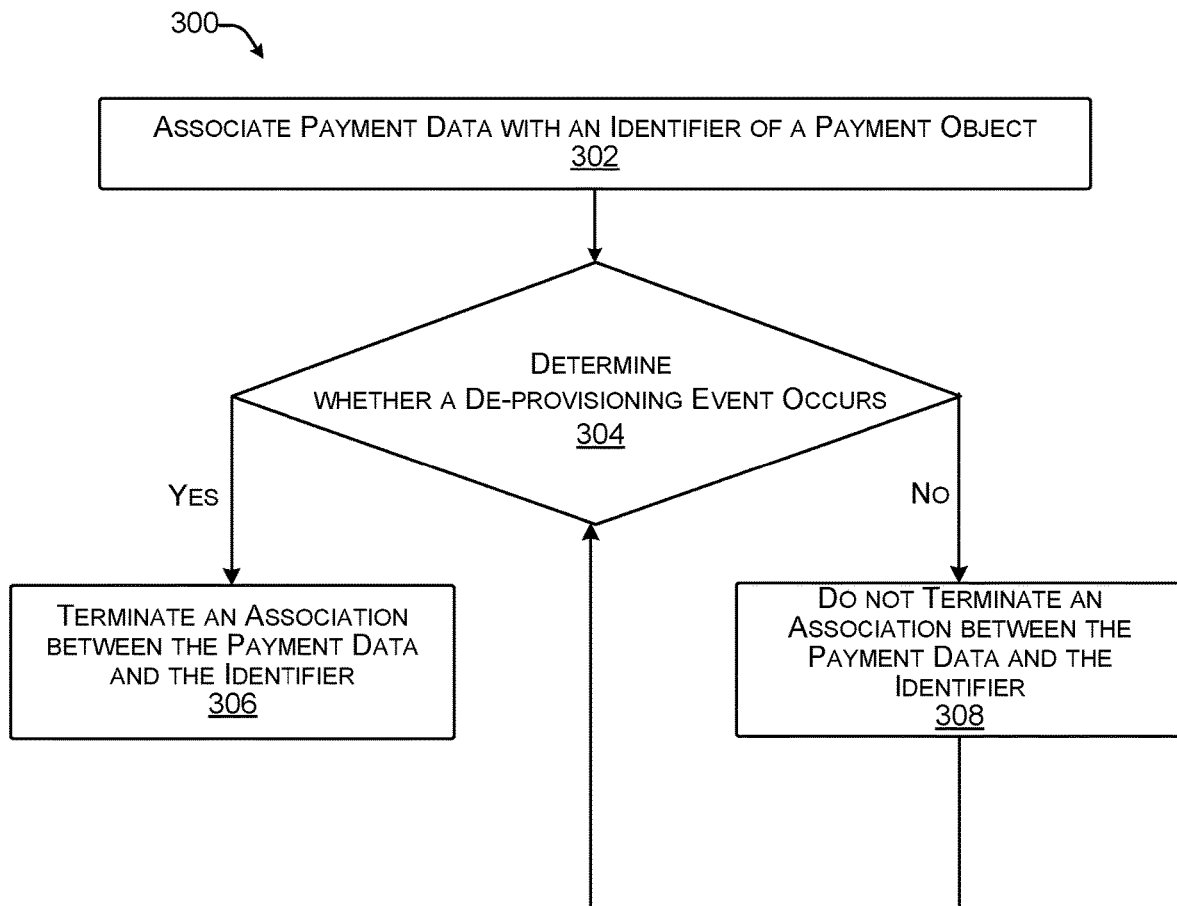
FIG. 3 illustrates an example process for terminating an association between a payment object and payment data associated with a payment instrument responsive to an occurrence of a de-provisioning event as described herein.

FIG. 3 illustrates an example process 300 for terminating an association between a payment object and payment data associated with a payment instrument responsive to an occurrence of a de-provisioning event as described herein.

Block 302 illustrates associating payment data with an identifier of a payment object. As described above, the associations module 114 can associate payment data with an identifier of a payment object. Such an association can be stored in the identifier database 116, as described above.

Block 304 illustrates determining whether a de-provisioning event occurs. In at least one example, associations between identifiers and payment data can be temporarily made in association with an event. That is, techniques described herein are directed to disassociating identifiers and payment data upon the occurrence of a de-provisioning event.

In at least one example, a de-provisioning event can include a conclusion of an event. In at least one example, the state module 120 can receive data associated with an event (e.g., event data) and can determine the conclusion of an event based on such event data. For instance, the data can indicate a start time, an end time, a start date, an end date, a geolocation (and associated geofence), etc. In some examples, such data can be provided by an event host (e.g., to the payment processing service). In other examples, the state module 120 can access third-party sources or systems (e.g., social media, websites, advertisements, etc.) to determine event data. In some examples, the event data can be stored in a database associated with the server(s) 112, as described below.

Furthermore, in at least one example, the state module 120 can determine a duration of an event (e.g., a period of time associated with an event) based at least in part on event data, as described herein, and can determine a lapse of the period of time of the event. Based at least in part on determining the lapse of the period of time, the state module 120 can determine that the event has concluded.

In another example, the state module 120 can analyze location data received from a plurality of merchant devices associated with merchants participating in an event. The state module 120 can determine, based on the location data, that more than a threshold number of merchants have moved outside of a geofence associated with the event, or more than a threshold distance away from one another. As such, the state module 120 can determine that the event has concluded.

In another example, a de-provisioning event can include a determination that the payment object moves outside of a geofence associated with an event. In such an example, the payment object can be associated with a sensor that outputs location data. In at least one example, the state module 120 can analyze the location data and determine that the location data indicates that the payment object is outside of a geofence associated with the event. Based at least in part on determining that the payment object is outside of the geofence, the state module 120 can determine an occurrence of a de-provisioning event.

In at least one example, the state module 120 can receive an explicit request to terminate an association between an identifier and payment data. The receipt of such a request can comprise a de-provisioning event. In some examples, such a request can be received from an instance of the merchant application 110 executing on a merchant device 102. For instance, in at least one example, the customer can tap the payment object to the reader device 104 and the reader device 104 can send the identifier associated with the payment object to the merchant application 110. The merchant application 110 can receive an indication that the customer wants to disassociate the wristband and the payment instrument, and the merchant application 110 can send an instruction indicating such to the state module 120.

In at least one example, a customer may not know the identifier associated with the payment object. In an example where a customer loses the payment object or the payment object is stolen (e.g., it is not in the customer's possession), the customer can provide a personal identifier (e.g., an email, a phone number, a biometric identifier, a customized code, a customized phrase, etc.) instead of the identifier of the payment object. In such examples, the customer can associate the personal identifier with the identifier and/or payment data as part of associating an identifier with payment data. That is, in some examples, as part of associating an identifier with payment data, the state module 120 can cause a prompt to be presented via a merchant device 102 and/or reader device 104 that requests a customer to provide one or more personal identifiers. Such personal identifier(s) can be mapped to, or otherwise associated with, the payment data and/or the identifier. Such associations can be stored in the identifier database 116, as described above. In yet another example, the customer can provide the payment instrument (if available) instead of a personal identifier.

In some examples, a de-provisioning event can be associated with a predetermined number of transactions, a predetermined dollar amount, a predetermined number of merchants, etc. That is, in such an example, the state module 120 can determine that the payment object has been used for more than the predetermined number of transactions and can determine to disassociate the association between the identifier and the payment data. Additionally or alternately, the state module 120 can determine that the payment object has been used for more than the predetermined dollar amount and can determine to disassociate the association between the identifier and the payment data. Moreover, the state module 120 can determine that the payment object has been used for more than the predetermined number of merchants and can determine to disassociate the association between the identifier and the payment data. Such limits can be imposed for security purposes or to otherwise limit the access that has been provisioned.

Based at least in part on determining an occurrence of a de-provisioning event, the associations module 114 can terminate the association between the identifier and the payment data, as illustrated in block 306. As such, the customer will no longer be able to use the payment object instead of the payment instrument. Based at least in part on determining that a de-provisioning event did not occur, the associations module 114 can refrain from terminating the association between the payment data and the identifier, as illustrated in block 308. Process 300 can repeat, as illustrated by the arrow returning to block 304, until the association is terminated.

Figure 4:
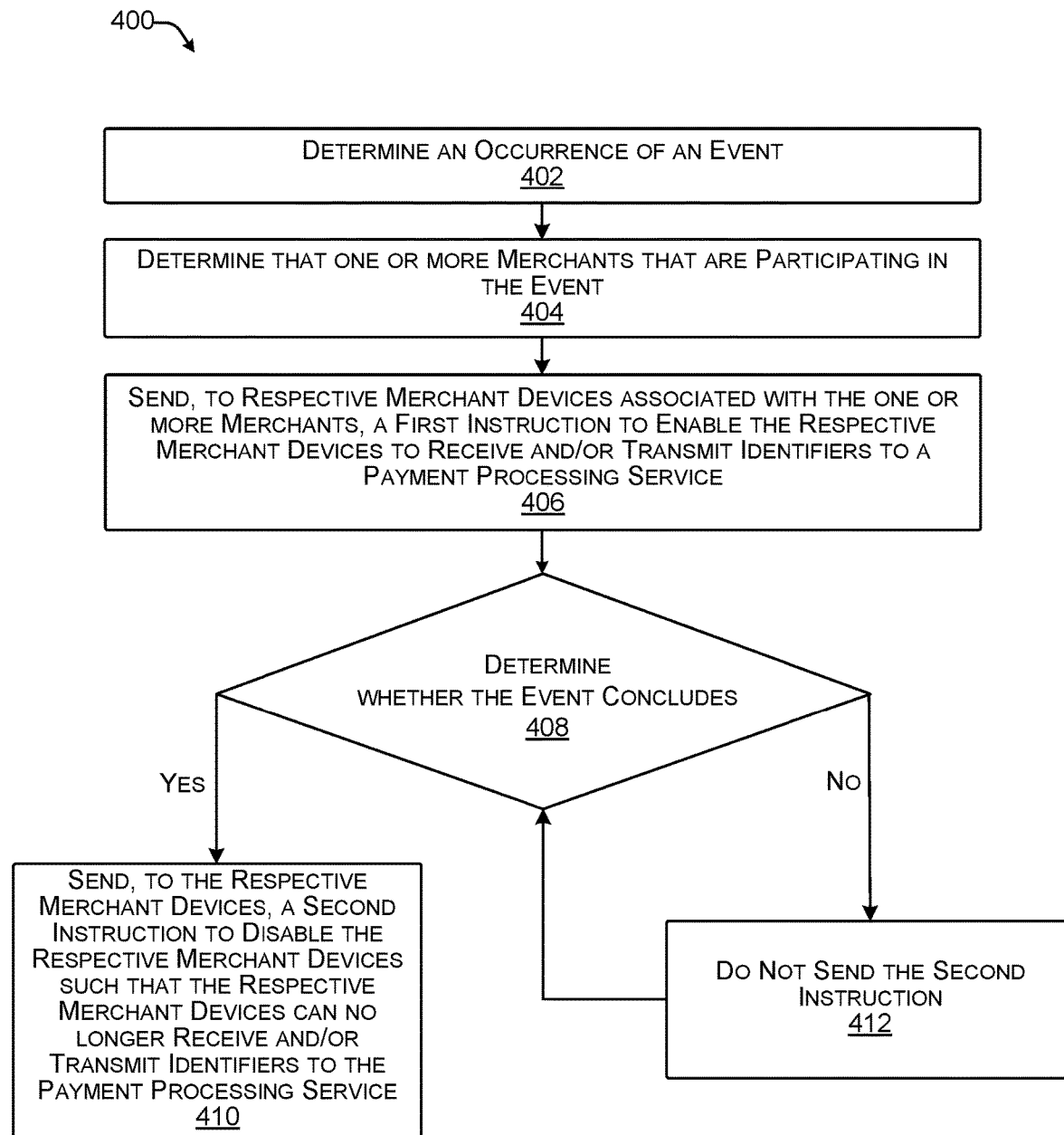
FIG. 4 illustrates an example process for provisioning and/or de-provisioning functionality to point-of-sale devices associated with an event as described herein.

FIG. 4 illustrates an example process 400 for provisioning and/or de-provisioning functionality to merchant devices associated with an event as described herein.

Block 402 illustrates determining an occurrence of an event. In at least one example, the state module 120 can determine an occurrence of an event.

In at least one example, the state module 120 can determine an occurrence of an event by analyzing location data received by one or more merchant devices. In such an example, the state module 120 can determine that the one or more merchant devices are located within a threshold distance of one another. In some examples, based on determining that more than a threshold number of merchant devices are located within a threshold distance of one another, the state module 120 can determine an occurrence of an event. In some examples, the state module 120 can compare the location of the one or more merchant device(s) with a geographic location known to be associated with an event (e.g., based at least in part on event data). Based at least in part on determining that one or more merchant devices are within a threshold distance of the location known to be associated with the event, the state module 120 can determine an occurrence of an event. In at least one example, the state module 120 can analyze whether the number of merchant devices exceeds a threshold. Thus, if the number of merchant devices within a threshold distance of a geographic location (which may or may not be known to be associated with an event) meets or exceeds a threshold, the state module 120 can determine an occurrence of an event.

Furthermore, in at least one example, the state module 120 can receive data associated with an event (e.g., event data) and can determine the occurrence of an event based on such event data.

Block 404 illustrates determining that one or more merchants are participating in an event. In at least one example, the state module 120 can identify one or more merchants participating in the event. For instance, the state module 120 can utilize location data associated with a merchant device to determine whether a corresponding merchant is participating in an event. In such an example, the state module 120 can compare the location data associated with the merchant device with a geolocation associated with the event (e.g., known or determined as described above). If the merchant device is within a threshold distance of the geolocation associated with the event, the state module 120 can determine that the merchant is participating in the event. Furthermore, if one or more merchant devices are within a threshold distance of one another, the state module 120 can determine that merchants associated with each of the one or more merchant devices are participating in the event. Moreover, in at least one example, a merchant can check-in to an event or otherwise be known to be associated with an event (e.g., based on event data). In such an example, the state module 120 can determine that the merchant is participating in the event.

Block 406 illustrates sending, to respective merchant devices associated with the one or more merchants, a first instruction to enable the respective merchant devices to receive and/or transmit identifiers to a payment processing service. Based on determining that a merchant is participating in an event, the state module 120 can send an instruction to activate a functionality associated with the merchant device 102 and/or the payment reader 104. In at least one example, the merchant device 102 and/or the payment reader 104 can have functionality associated with reading, transmitting, and/or receiving identifiers (e.g., in addition to payment data). In at least one example, such functionality can be activated and/or deactivated via the merchant application 110. However, in at least one example, a default state associated with the merchant device 102 and/or the payment reader 104 can be "inactive." That is, if a merchant is not participating in an event—or has not otherwise enabled such functionality—the payment reader 104 may not be able to read identifiers and the merchant device 102 (e.g., the merchant application 110) may not be able to receive and/or transmit identifiers.

Block 408 illustrates determining whether the event concludes. In at least one example, the state module 120 can determine whether the event concludes, as described above. Based at least in part on determining that the event concludes, the state module 120 can send, to the respective merchant devices, a second instruction to disable the respective merchant devices such that the respective merchant devices can no longer receive and/or transmit identifiers to the payment processing service, as illustrated in block 410. That is, based at least in part on determining that the event concludes, the state module 120 can instruct the merchant application 110 to turn off the functionality associated with the reading, transmitting, and/or receiving identifiers. Based at least in part on determining that the event does not conclude, the state module 120 can refrain from sending the second instruction, as illustrated in block 412, and can return to block 408 to determine whether the event concludes.

In some examples, the functionality described herein can be de-provisioned based on a merchant device moving outside of a geofence associated with an event. For instance, if the state module 120 determines that the merchant is outside of a geofence associated with an event, the state module 120 can send the second instruction. Or, if the merchant expressly indicates that it wants to terminate such functionality. In such an example, the state module 120 can send the second instruction responsive to receiving an indication from a merchant device indicating that the merchant desires to terminate such functionality. Or, the merchant can interact with the merchant application 110 to turn off such functionality.

Figure 5:
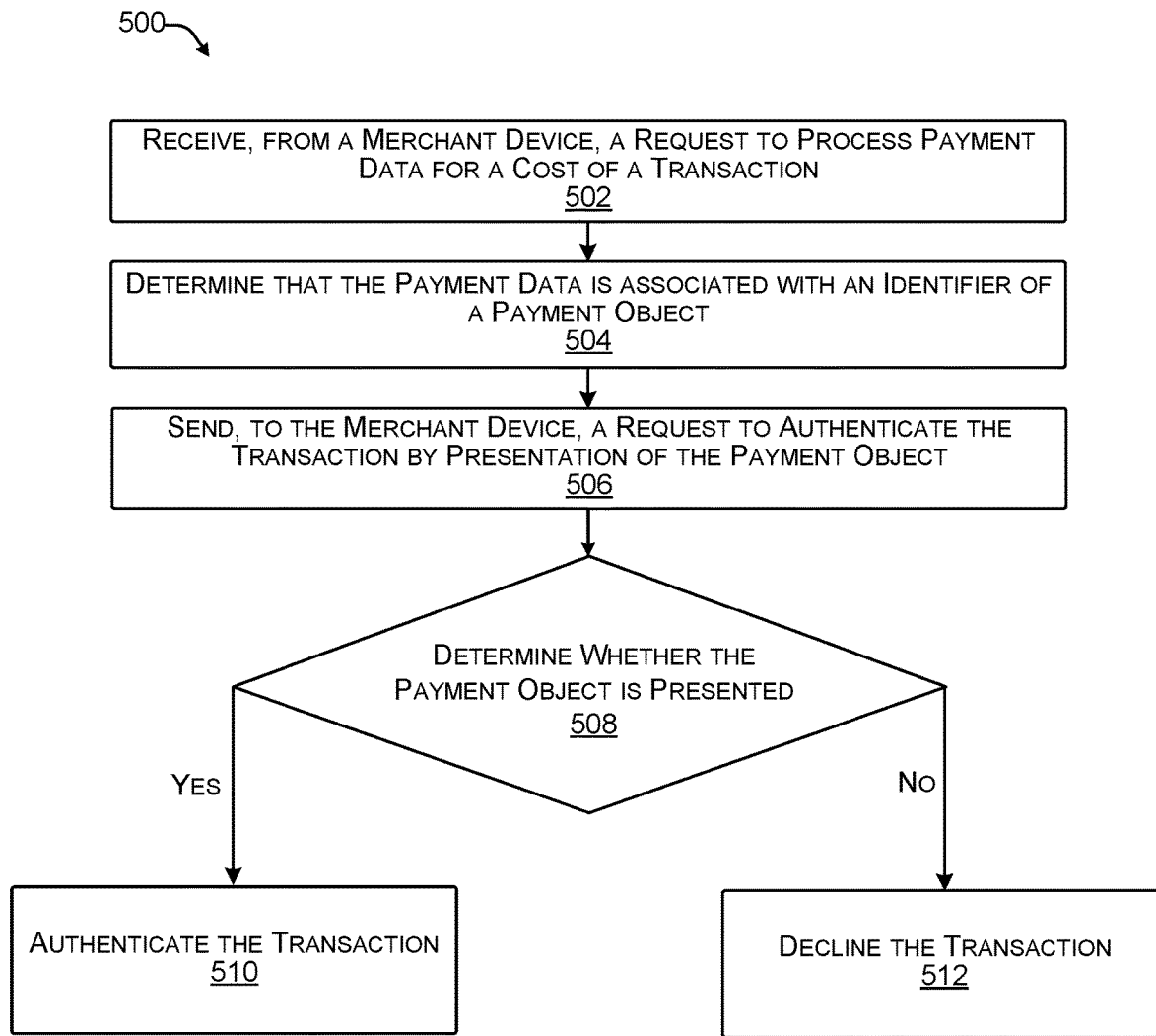
FIG. 5 illustrates an example process for utilizing a payment object associated with payment data associated with a payment instrument for two factor authentication as described herein.

FIG. 5 illustrates an example process 500 for utilizing a payment object associated with payment data, that is associated with a payment instrument, for two factor authentication as described herein.

Block 502 illustrates receiving, from a merchant device, a request to process payment data for a cost of a transaction. In at least one example, the reader device 104 can read payment data off of a payment instrument. The merchant application 110 can send the payment data and transaction data to the server(s) 112. In at least one example, the merchant application 110 can send a request to authorize the payment data (and thus the payment instrument) for a cost of the transaction. The transaction processing module 118 can receive the payment data and the transaction data.

Block 504 illustrates determining that the payment data is associated with an identifier of a payment object. In at least one example, the transaction processing module 118 can determine that the payment data is associated with an identifier of a payment object. For instance, the transaction processing module 118 can access the identifier database 116 to determine that the payment data is mapped to, or otherwise associated with, an identifier of a payment object.

Block 506 illustrates sending, to the merchant device, a request to authenticate the transaction by presentation of the payment object. In at least one example, the transaction processing module 118 can send a request to the merchant device 102 (e.g., the merchant application 110) to authenticate the transaction by presentation of the payment object associated with the identifier. Responsive to receiving the request, the merchant application 110 can present a prompt via the merchant device 102 and/or the reader device 104. The prompt can request the customer present the payment object.

Block 508 illustrates determining whether the payment object is presented. Based at least in part on receiving the identifier associated with the payment object from the merchant device 102, which obtained it from the reader device 104 (e.g., indicating that the payment object was presented), the transaction processing module 118 can process the transaction, as illustrated in block 510. If the payment object is not presented, the transaction processing module 118 can decline the transaction, as illustrated in block 512.

In an alternate example, a customer can use a payment object as payment for a transaction (as described above) and the merchant application 110 can prompt the customer to input a personal identifier (e.g., a PIN, an image, an email address, a phone number, a personalized logo, a personalized phrase, a personalized code, etc.) or otherwise authenticate their identity. That is, techniques described herein can include two factor authentication associated with the payment object.

Figure 6:
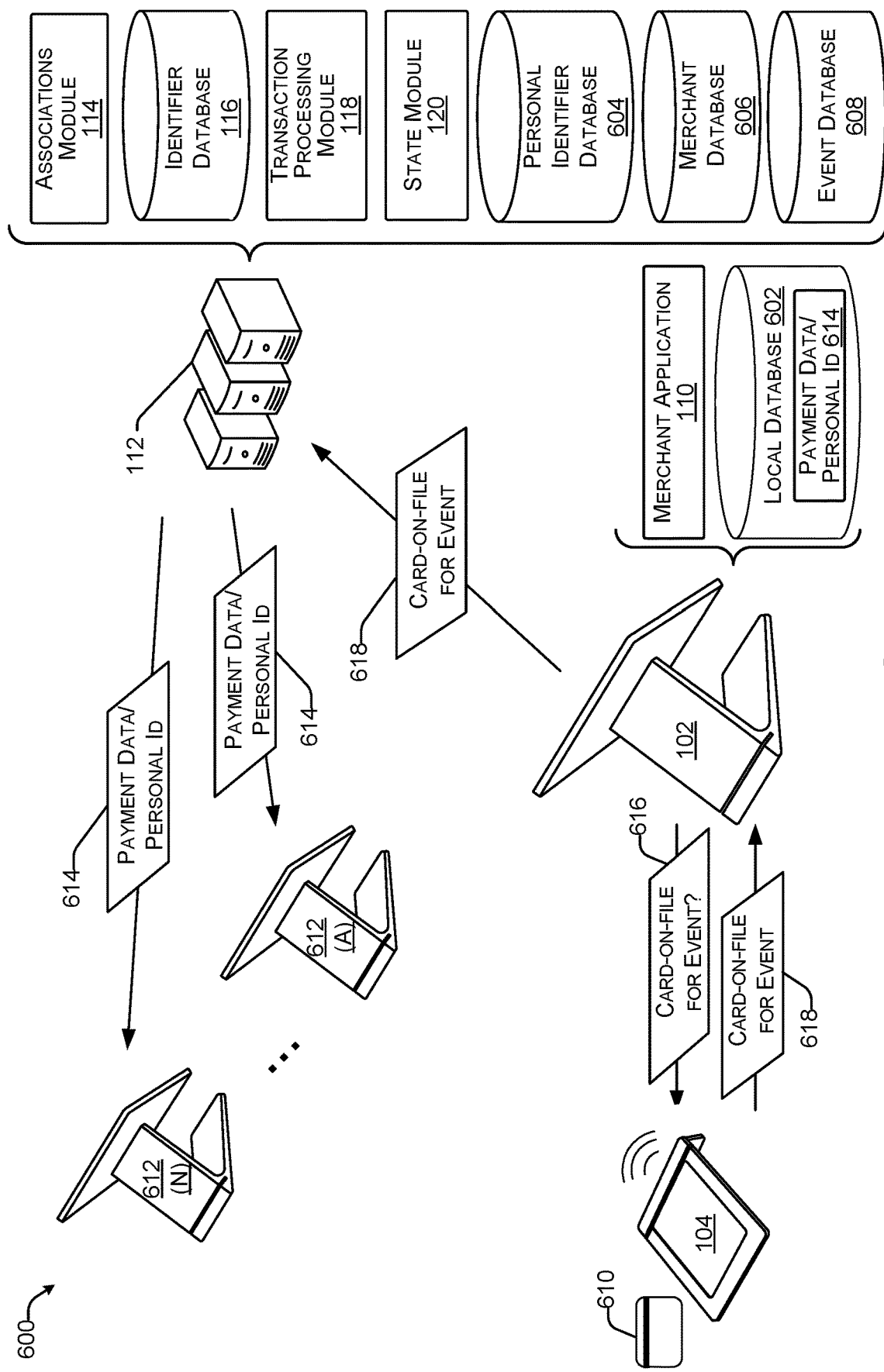
FIG. 6 illustrates an example system for temporarily provisioning card on file functionality to merchants associated with an event as described herein.

FIG. 6 illustrates an example system 600 for temporarily provisioning card on file functionality to merchants associated with an event as described herein. FIG. 6 can include the merchant device 102 and the reader device 104, as described above with reference to FIG. 1. In at least one example, as illustrated in FIG. 6, the merchant device 102 can include a local database 602, which can store payment data (e.g., card on file) and/or personal identifiers associated with such payment data (instead of, or in addition to the payment data). The local database 602 can be a directory indicative of one or more customers that have stored their cards on file with the merchant. In an example where a personal identifier is stored in the local database 602, payment data associated with the personal identifier can be stored remotely, for instance, in association with the server(s) 112.

In addition to the components illustrated in FIG. 1, the server(s) 112 can include a personal identifier database 604, a merchant database 606, and an event database 608.

The personal identifier database 604 can store associations between personal identifiers (e.g., an email, a phone number, a biometric identifier, a customized code, a customized phrase, etc.) and payment data. In some examples, the personal identifier database 604 can be associated with customer profiles. In such examples, a customer profile can store customer data including, but not limited to, personal data associated with a customer (e.g., including personal identifier(s)), payment instrument(s) associated with the customer (e.g., and associated payment data), item(s) purchased by the customer, transaction data associated with transaction(s) of the customer, etc.

In at least one example, the merchant database 606 can store information associated with individual merchant(s), in merchant profiles for example. A merchant profile can store merchant data including, but not limited to, an identifier of the merchant, a MCC, item(s) offered for sale by the merchant, transaction data associated with transactions conducted by the merchant (e.g., via the merchant application 110), hardware (e.g., device type) used by the merchant, previous loans made to the merchant, previous defaults on said loans, an indication of risk (e.g., based at least in part on fraud, chargeback, etc.) associated with the merchant, etc. Furthermore, in at least one example, the merchant database 606 can store associations between merchants and personal identifiers (e.g., which personal identifiers have been shared with which merchants), associations between merchants and events (e.g., which events individual merchants are participating in), etc.

The event database 608 can store event data associated with events including, but not limited to start times, end times, start dates, end dates, geolocations (and associated geofences), etc. In some examples, the event database 608 can store associations between events and merchants (e.g., indicating which merchants are participating in particular events, etc.).

In at least one example, a customer can store payment data with a particular merchant, for instance, via card on file functionality. That is, in at least one example, a customer can facilitate an interaction between a payment instrument 610 and the reader device 104. The customer can opt to store payment data associated with the payment instrument 610 on file so that in future transactions, the customer does not need to present the payment instrument 610. In the future, the merchant can interact with a user interface that includes a selectable control representative of the customer (e.g., presented via the merchant application 110) and the transaction processing module 118 can obtain payment data associated with the payment instrument 610 for processing transactions without the customer presenting the payment instrument 610. A customer and/or merchant can add the customer's payment instrument 610 to the local database 602 at any time prior to an event, during an event, etc. In some examples, as described below, the customer's payment instrument 610 can be added to the local database 602 by adding payment data associated with the payment instrument 610 to the local database 602 and/or adding a personal identifier that references the payment data to the local database 602.

In at least one example, as described above, multiple merchants can participate in an event. As illustrated in FIG. 6, there are a plurality of merchant devices 612(A)-612(N) present (in addition to the merchant device 102). While merchant devices 612(A)-612(N) are shown as being substantially identical to the merchant device 102, in alternative examples, the plurality of merchant devices 612(A)-612(N) can be any type of merchant device. In at least one example, each merchant device 102, 612(A)-612(N) can have an instance of the merchant application 110 and an instance of a local database 602 stored thereon. In at least one example, each of the merchant devices 102 and 612(A)-612(N) can subscribe to payment processing services offered by the payment processing service.

In at least one example, the customer can attend an event in which the merchant is participating. At the event, the customer can transact with the merchant and the merchant can access payment data 614 associated with the payment instrument 610 (or a personal identifier associated therewith) that is stored in the local database 602 (e.g., on file) to settle the transaction. In at least one example, based on the merchant participating in the event, the merchant application 110 can cause an inquiry 616 to be presented to the customer. The inquiry 616 can inquire whether the customer desires to store the payment data 614 on file for an event. That is, the inquiry 616 can inquire whether the customer desires to store the payment data 614 on file with each of the merchants participating in the event, for the duration of the event. In an example where the customer desires to store the payment data 614 on file, the merchant application 110 can receive a response 618 indicating that the customer desires to store the payment data 614 on file for the duration of the event. The merchant application 110 can send the response 618 to the server(s) 112.

In FIG. 6, the inquiry 616 is illustrated as being sent to the reader device 104 and presented via the reader device 104 in order to generate the response 618, which is sent from the reader device 104 to the merchant application 110. In FIG. 6, the reader device 104 includes a display for presenting such an inquiry 616. However, in alternate examples, the inquiry 616 can be presented via a display of the merchant device 102 (thereby eliminating the data exchange between the reader device 104 and the merchant device 102). In such an example, the response 618 can be received via the merchant device 102, and the merchant application 110 can transmit the response 618 from the merchant device 110 to the server(s) 112.

Responsive to receiving the response 618, the associations module 114 can access one or more of the databases (e.g., merchant database 606, event database 608, etc.) to determine which merchant(s) are participating in an event. That is, the associations module 114 can determine one or more merchants that are mapped to, or otherwise associated with, the event. Based on identifying such merchant(s), the associations module 114 can send, or otherwise provision, the payment data 614 (or a personal identifier associated therewith, as described below) to the plurality of merchant devices 612(A)-612(N) and each of the plurality of merchant devices 612(A)-612(N) can temporarily store the payment data 614 (or the personal identifier associated therewith) in a local database 602. In such an example, the plurality of merchant devices 612(A)-612(N) (e.g., the instance of the merchant application 110 executing thereon) can update their directory of customers (e.g., respective instances of the local database 602) to include the payment data 614 and/or personal identifier of the customer.

As described above, card on file functionality is particularly beneficial to customers that frequently visit a merchant. The frequency and strength of the relationship between regular customers and the merchant establish a level of trust between such regular customers and the merchant. However, in scenarios such as those described herein (e.g., where a customer and merchant are at an event), a customer may not know or otherwise be familiar with other merchants participating in the event, and vice versa. In some examples, the merchant device 102 can prompt a customer to provide a personal identifier (e.g., a PIN, an image, an email address, a phone number, a personalized logo, a personalized phrase, a personalized code, etc.) at the time the customer sets up the card on file functionality and/or in association with the transaction at the event. The personal identifier can be associated with the payment data 614 in the local database 602. Further, the personal identifier can be provided to the server(s) 112 and the associations module 116 can map, or otherwise associate, the personal identifier with the payment data 614 in the personal identifier database 604. In such an example, responsive to receiving the response 618 that the customer desires to store the payment instrument 610 on file for the duration of the event, the associations module 114 can provide the payment data 614 and/or the personal identifier to the other merchant devices 612(A)-612(N) and the other merchant devices 612(A)-612(N) can store the payment data 614 and/or the personal identifier in the respective local databases 602. The personal identifier can reference the payment data 614 in examples where the payment data 614 is retained by the server(s) 112 and the other merchant devices 612(A)-612(N) receive the personal identifier.

As such, when the customer transacts with one of the other merchants, the corresponding merchant device 612(A)-612(N) can send the payment data 614 and/or personal identifier to the server(s) 112. In an example where the personal identifier is provided by the merchant device 612(A)-612(N), the transaction processing module 118 can receive the personal identifier and access the personal identifier database 604. The transaction processing module 118 can determine that the personal identifier is mapped to, or otherwise associated with, the payment data 614, and the transaction processing module 118 can utilize the payment data 614 to process transactions between the customer and the other merchant.

In some examples, the customer can selectively choose to store the payment instrument 610 on file with one or more of the other merchants. In such examples, the associations module 114 can send the payment data 614 and/or personal identifier to the merchant device(s) 612(A)-612(N) corresponding to the selected merchants.

In at least one example, the payment data 614 and/or personal identifier can be provisioned to the other merchant devices 612(A)-612(N) temporarily. That is, in some examples, an association between one of the other merchants and the payment data 614 and/or personal identifier can be terminated after the occurrence of a de-provisioning event, as described below. Furthermore, techniques described herein are directed to de-provisioning extended card on file functionality based on temporal and/or geographic limitations, or an express indication to de-provision such functionality (e.g., for security purposes).

Furthermore, while locally storing payment data and/or a personal identifier associated with the payment data is described herein as "card on file" technology, the same functionality can be available for any type of payment instrument and is not limited to cards. That is, "card on file" can refer to the storage of payment data (associated with any type of payment instrument) in association with a merchant (e.g., locally on a respective merchant device).

Figure 7:
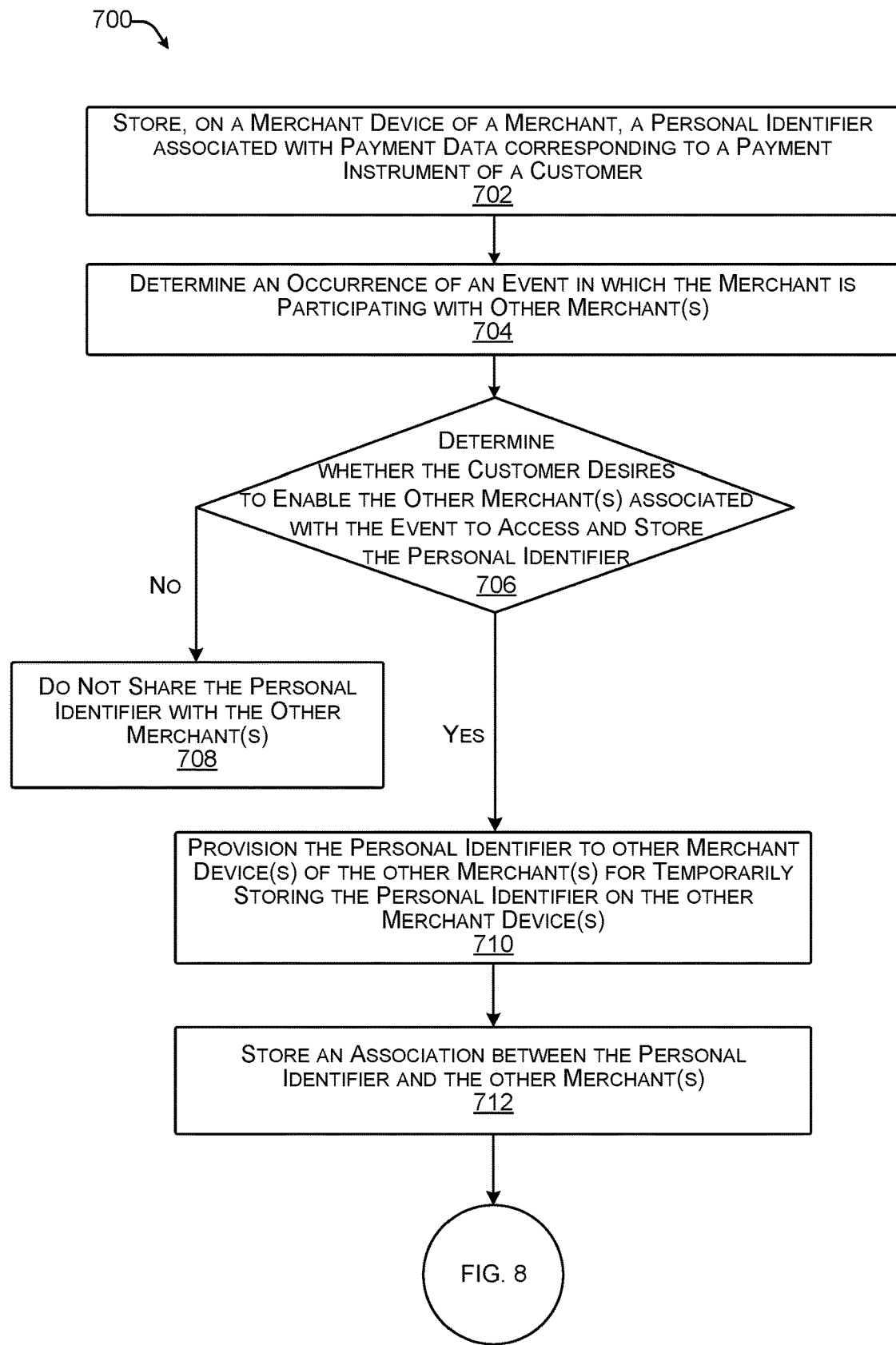
FIG. 7 illustrates an example process for temporarily provisioning card on file functionality for merchants associated with an event as described herein.
Figure 8:
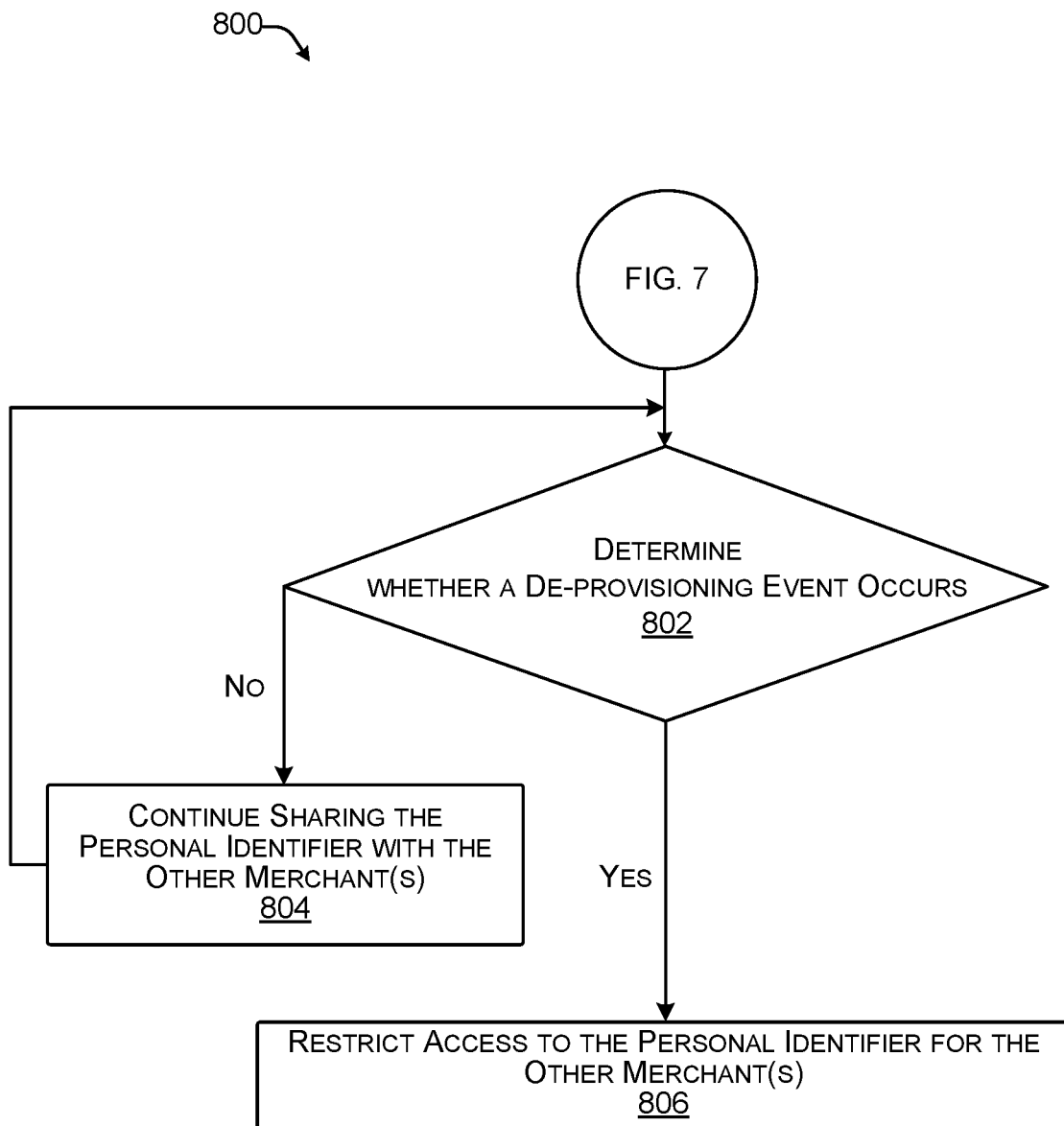
FIG. 8 illustrates an example process for de-provisioning card on file functionality for merchants associated with an event as described herein.
Figure 9:
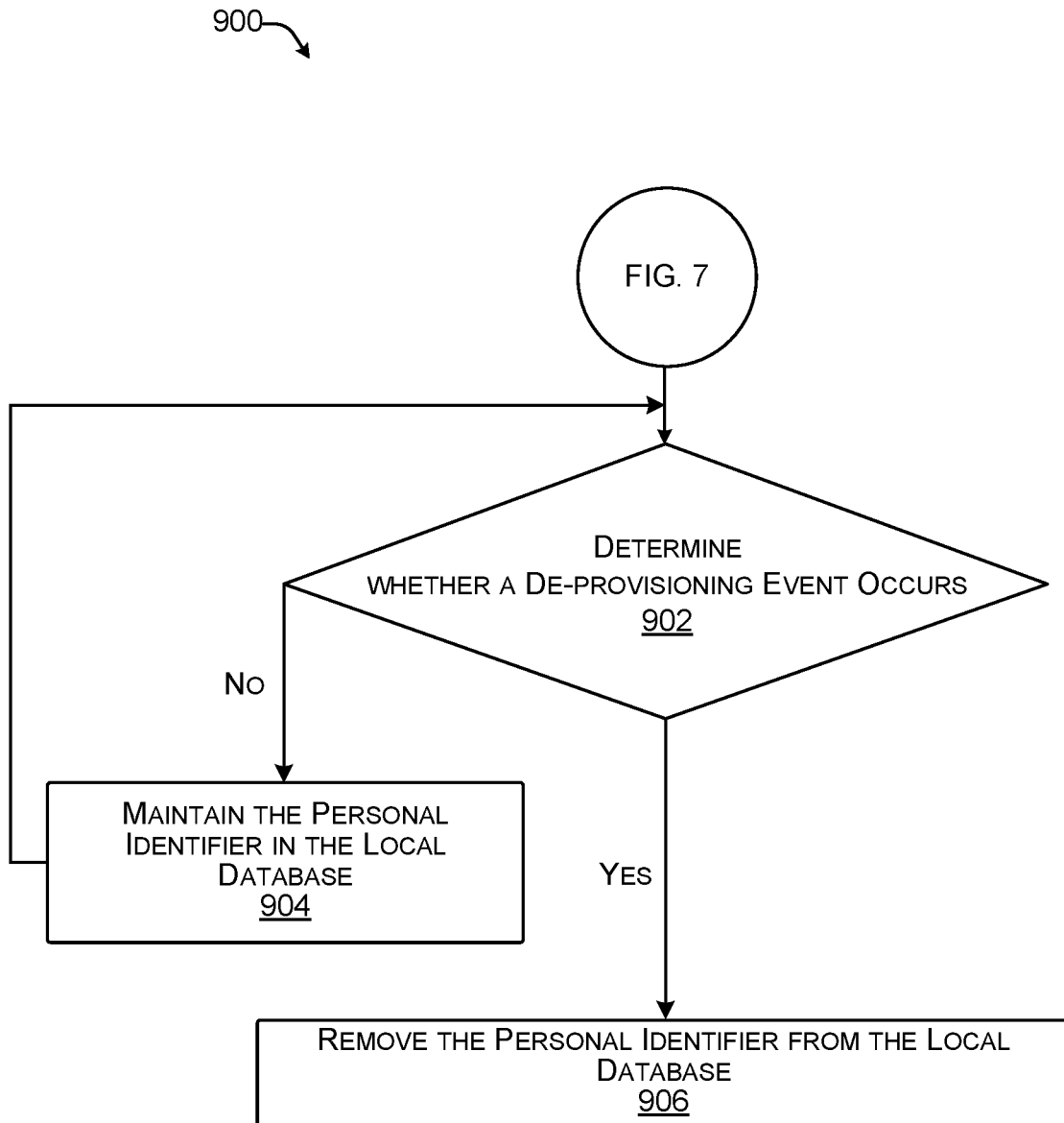
FIG. 9 illustrates an example process for de-provisioning card on file functionality for a merchant associated with an event as described herein.

FIGS. 7-9 are flow diagrams illustrating example processes according to some implementations. The processes of FIGS. 7-9 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 7-9 can be combined with some or all of the operations illustrated in others of FIGS. 7-9. For discussion purposes, the processes are described with reference to the environments, architectures and devices described in FIGS. 1 and 6 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

FIG. 7 illustrates an example process 700 for temporarily provisioning card on file functionality for merchants associated with an event as described herein.

Block 702 illustrates storing, on a merchant device of a merchant, a personal identifier associated with payment data corresponding to a payment instrument of a customer. In at least one example, a customer can store payment data with a particular merchant, for instance, via card on file functionality. As described above, in at least one example, a customer can facilitate an interaction between a payment instrument 610 and the reader device 104. The customer can opt to store payment data associated with the payment instrument 610 on file (e.g., in a local database 602 associated with a merchant device 102) so that in future transactions, the customer does not need to present the payment instrument 610. In the future, the merchant can interact with a user interface that includes a selectable control representative of the customer (e.g., presented via the merchant application 110) and the transaction processing module 118 can obtain payment data associated with the payment instrument 610 for processing transactions without the customer presenting the payment instrument 610. A customer and/or merchant can add the customer's payment instrument 610 to the local database 602 at any time prior to an event, during an event, etc.

In some examples, the merchant device 102 can prompt a customer to provide a personal identifier (e.g., a PIN, an image, an email address, a phone number, a personalized logo, a personalized phrase, a personalized code, etc.) at the time the customer sets up the card on file functionality and/or in association with a transaction at an event. The personal identifier can be associated with the payment data 614 in the local database 602. Further, the personal identifier can be provided to the server(s) 112 and the associations module 116 can map, or otherwise associate, the personal identifier with the payment data 614 in the personal identifier database 604.

Block 704 illustrates determining an occurrence of an event in which the merchant is participating with other merchant(s). As described above, in at least one example, the state module 120 can determine an occurrence of an event. In at least one example, the state module 120 can determine an occurrence of an event by analyzing location data received by one or more merchant devices. Furthermore, in at least one example, the state module 120 can access the event database 608 and receive data associated with an event (e.g., event data) and can determine the occurrence of an event based on such data.

In at least one example, the state module 120 can determine that the merchant and one or more other merchants are participating in an event. In some examples, the state module 120 can make such a determination based on the location data and/or event data. In additional or alternate examples, the state module 120 can determine which merchants are participating in an event based on stored associations in the merchant database 606 and/or the event database 608. In at least one example, the state module 120 can send an indication of the event to the merchant application 110.

Block 706 illustrates determining whether the customer desires to enable other merchant(s) associated with the event to access and store the personal identifier. In at least one example, based on determining an occurrence of an event in which the merchant is participating with other merchant(s) and receiving an indication of such from the state module 120, the merchant application 110 can cause an inquiry 616 to be presented to the customer. The inquiry 616 can inquire whether the customer desires to store the payment data 614 on file for the event. That is, the inquiry 616 can inquire whether the customer desires to store the payment data 614, or an associated personal identifier, on file with each of the merchants participating in the event, for the duration of the event.

If the customer indicates that the customer does not desire to enable the other merchant(s) associated with the event to access and store the personal identifier, the associations module 114 can refrain from sharing the personal identifier with the other merchant(s), as illustrated in block 708.

If the customer indicates that the customer desires to enable the other merchant(s) associated with the event to access and store the personal identifier, the associations module 114 can send, or otherwise provision, the personal identifier to other merchant device(s) of the other merchant(s) for temporarily storing the personal identifier on the other merchant device(s), as illustrated in block 710. In an example where the customer desires to store the payment data 614 on file, the merchant application 110 can receive a response 618 indicating that the customer desires to store the payment data 614 on file for the duration of the event. The merchant application 110 can send the response 618 to the server(s) 112.

Responsive to receiving the response 618, the associations module 114 can send, or otherwise provision, the personal identifier associated with the payment data 614 to the plurality of merchant devices 612(A)-612(N) and each of the plurality of merchant devices 612(A)-612(N) can temporarily store the personal identifier respective instances of the local database 602. In such an example, the plurality of merchant devices 612(A)-612(N) (e.g., the instance of the merchant application 110 executing thereon) can update their directory of customers (e.g., respective instances of the local database 602) to include the payment data 614 and/or personal identifier of the customer.

Block 712 illustrates storing an association between the personal identifier and the other merchant(s). In at least one example, the associations module 114 can map, or otherwise associate, the personal identifier with the other merchants in the merchant database 606. Responsive to receiving the response 618, the associations module 114 can map, or otherwise associate, the personal identifier with the payment data 614 in the personal identifier database 604.

As described above, in at least one example, the payment data 614 and/or personal identifier can be provisioned to the other merchant devices 612(A)-612(N) temporarily. That is, in some examples, an association between one of the other merchants and the payment data 614 and/or personal identifier can be terminated after the occurrence of a de-provisioning event, as described below with reference to FIGS. 8 and 9.

FIG. 8 illustrates an example process 800 for de-provisioning card on file functionality for merchants associated with an event as described herein.

Block 802 illustrates determining whether a de-provisioning event occurs. As described above, the state module 120 can determine an occurrence of a de-provisioning event. In at least one example, a de-provisioning event can include a conclusion of an event. For instance, in at least one example, the state module 120 can determine the conclusion of the event based on location data and/or event data. In at least one example, the state module 120 can receive an explicit request to terminate an association between a payment instrument and a particular merchant (or merchants). The receipt of such a request can comprise a de-provisioning event. In some examples, such a request can be received from an instance of the merchant application 110 executing on a merchant device 102 and/or 612(A)-612(N).

Based at least in part on determining that a de-provisioning event has not occurred, the personal identifier can continue to be shared with the other merchant(s), as illustrated in block 804. In such an example, the other merchant(s) can continue to utilize the card on file functionality until a de-provisioning event occurs (as is shown by the arrow returning to block 802).

Block 806 illustrates restricting access to the personal identifier for the other merchant(s). Based at least in part on determining the occurrence of the de-provisioning event, the state module 120 can send an instruction to the associations module 114. The instruction can instruct the associations module 114 to terminate associations between the de-provisioned merchants and the personal identifier. Furthermore, the associations module 114 can send an instruction to the merchant applications 110 on merchant devices 102 and/or 612(A)-612(N) of the de-provisioned merchants to remove the personal identifier from the respective local databases 602.

FIG. 9 illustrates an example process 900 for de-provisioning card on file functionality for a merchant associated with an event as described herein.

Block 902 illustrates determining whether a de-provisioning event occurs. In at least one example, the merchant application 110 can determine an occurrence of a de-provisioning event. In some examples, the originally provisioned personal identifier can be associated with one or more limitations that can be used by the merchant application 110 to determine an occurrence of a de-provisioning event. In at least one example, a limitation can be associated with a period of time, which can be based on a duration of an event. The merchant application 110 can determine a lapse in a period of time and can determine a de-provisioning event. Additionally or alternately, a limitation can be associated with a geolocation, which can correspond to a geofence associated with an event. The merchant application 110 can determine that the corresponding merchant device is outside of the geofence and can determine a de-provisioning event.

In at least one example, the merchant application 110 can receive an instruction from the associations module 114 to remove the personal identifier from the local database 602, as described above. In such an example, the merchant application 110 can determine a de-provisioning event.

Based at least in part on determining that a de-provisioning event has not occurred, the personal identifier be maintained in the local database 602, as illustrated in block 904. In such an example, the merchant can continue to utilize the card on file functionality until a de-provisioning event occurs (as is shown by the arrow returning to block 902).

Block 906 illustrates removing the personal identifier from the local database. Based at least in part on determining the occurrence of the de-provisioning event, the merchant application 110 can remove the personal identifier from the local database 602. In some examples, the merchant application 110 can send a confirmation to the associations module 114 confirming that the personal identifier has been removed. As such, the merchant can no longer use the personal identifier to complete transactions, as was available with the card on file functionality.

Figure 10:
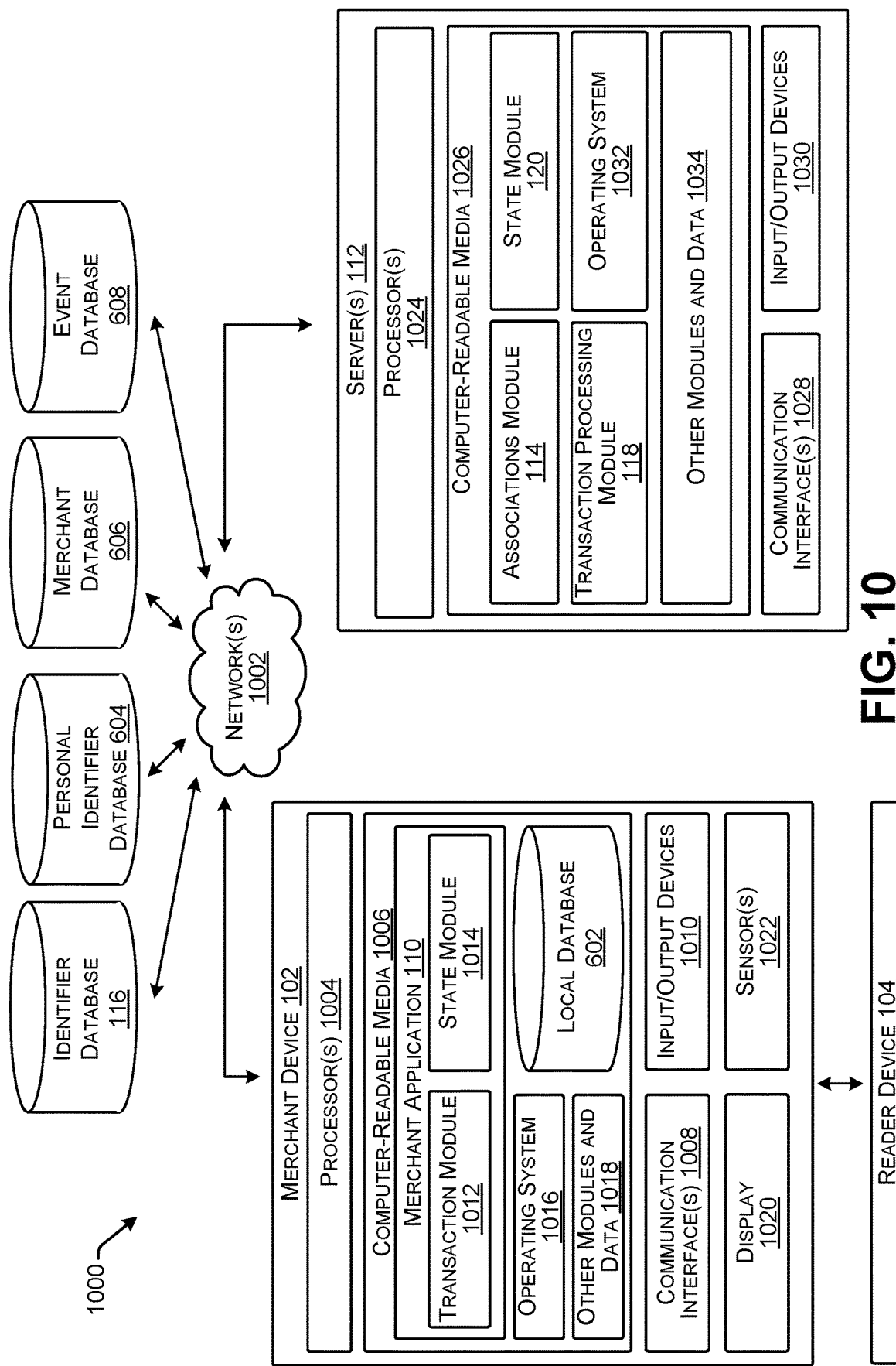
FIG. 10 illustrates an example system for enabling techniques as described herein.

FIG. 10 depicts an illustrative block diagram illustrating a system 1000 for performing techniques described herein. The system 1000 includes a merchant device 102, that communicates with server computing device(s) (e.g., server(s) 106) via network(s) 1002 (e.g., the Internet, cable network(s), cellular network(s), wireless network(s) (e.g., Wi-Fi) and wired network(s), as well as close-range communications such as Bluetooth®, Bluetooth® low energy, and the like). In at least one example, such as the example illustrated in FIGS. 1 and 10, the reader device 104 can be external to, and wirelessly coupled to, the merchant device 104. However, in an alternate example, the reader device 104 can be integral to, or integrated with, the merchant device 102. While a single merchant device 102 and reader device 104 are illustrated, in additional or alternate examples, the system 1000 can have multiple merchant devices and/or reader devices.

In at least one example, the merchant device 102 can be any suitable type of computing device, e.g., portable, semi-portable, semi-stationary, or stationary. Some examples of the merchant device 102 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 102 includes one or more processors 1004, one or more computer-readable media 1006, one or more communication interfaces 1008, and one or more input/output (I/O) devices 1010. Each processor 1004 can itself comprise one or more processors or processing cores. For example, the processor(s) 1004 can be implemented as one or more microprocessors, microcomputers, microcontrollers, digital signal processors, central processing units, state machines, logic circuitries, and/or any devices that manipulate signals based on operational instructions. In some examples, the processor(s) 1004 can be one or more hardware processors and/or logic circuits of any suitable type specifically programmed or configured to execute the algorithms and processes described herein. The processor(s) 1004 can be configured to fetch and execute computer-readable processor-executable instructions stored in the computer-readable media 1006.

Depending on the configuration of the merchant device 102, the computer-readable media 1006 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1006 can include, but is not limited to, RAM, ROM, EEPROM, flash memory, solid-state storage, magnetic disk storage, optical storage, and/or other computer-readable media technology. Further, in some examples, the merchant device 102 can access external storage, such as RAID storage systems, storage arrays, network attached storage, storage area networks, cloud storage, or any other medium that can be used to store information and that can be accessed by the processor(s) 1004 directly or through another computing device or network. Accordingly, the computer-readable media 1006 can be computer storage media able to store instructions, modules or components that can be executed by the processor(s) 1004. Further, when mentioned, non-transitory computer-readable media exclude media such as energy, carrier signals, electromagnetic waves, and signals per se.

The computer-readable media 1006 can be used to store and maintain any number of functional components that are executable by the processor(s) 1004. In some implementations, these functional components comprise instructions or programs that are executable by the processor(s) 1004 and that, when executed, implement operational logic for performing the actions and services attributed above to the merchant device 102. Functional components stored in the computer-readable media 1006 can include the merchant application 110, which can include a transaction module 1012 and a state module 1014.

The merchant application 110 can provide POS functionality to the merchant device 102 to enable the merchant to accept payments from one or more customers at a POS location. For example, the merchant can use the merchant device 102 to accept payments through various different types of payment instruments, e.g., payment cards, electronic payment, cash or check, cryptocurrency, etc. at the POS location from the one or more customers. Furthermore, as described above, in some examples, the merchant can use the merchant device 102 to accept identifiers and/or utilize the identifiers and/or personal identifiers associated with payment data for processing transactions. In at least one example, the transaction module 1012 can present various user interfaces to enable a merchant to conduct transactions, receive payments, and so forth. In at least one example, the transaction module 1012 can send data associated with the payments (e.g., transaction data) to the server computing device(s) 110. Further, the state module 1014 can maintain the state of the merchant device 102, for instance, with respect to whether the merchant device 102 (and associated reader device 104) are capable of reading, transmitting, and/or receiving identifiers associated with payment objects.

Furthermore, the computer-readable media 1006 can include additional functional components, such as an operating system 1016 for controlling and managing various functions of the merchant device 102 and for enabling basic user interactions. In addition, the computer-readable media 1006 can also store data, data structures and the like, that are used by the functional components. Depending on the type of the merchant device 102, the computer-readable media 1006 can also optionally include other functional components and data, such as other modules and data 1018, which can include programs, drivers, etc., and the data used or generated by the functional components. Further, the merchant device 102 can include many other logical, programmatic and physical components, of which those described are merely examples that are related to the discussion herein. In at least one example, the merchant device 102 can include the local database 602, as described above with reference to FIG. 6.

The communication interface(s) 1008 can include one or more interfaces and hardware components for enabling communication with various other devices, such as over the network(s) 1002 or directly. For example, communication interface(s) 1008 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant device 102 can further include the one or more I/O devices 1010. The I/O devices 1010 can include speakers, a microphone, a camera, and various user controls (e.g., buttons, a joystick, a keyboard, a keypad, etc.), a haptic output device, and so forth.

In at least one example, merchant device 102 can include a display 1020. Depending on the type of computing device (s) used as the merchant device 102, the display 1020 can employ any suitable display technology. For example, the display 1020 can be a liquid crystal display, a plasma display, a light emitting diode display, an OLED (organic light-emitting diode) display, an electronic paper display, or any other suitable type of display able to present digital content thereon. In some examples, the display 1020 can have a touch sensor associated with the display 1020 to provide a touchscreen display configured to receive touch inputs for enabling interaction with a graphic interface presented on the display 1020. Accordingly, implementations herein are not limited to any particular display technology. Alternatively, in some examples, the merchant device 102 may not include the display 1020, and information can be presented by other means, such as aurally.

In addition, the merchant device 102 can include sensor(s) 1022. The sensor(s) 1022 can include a GPS device able to indicate location information. Further, the sensor(s) 1022 can include, but are not limited to, an accelerometer, gyroscope, compass, proximity sensor, camera, microphone, and/or a switch. Additionally, the merchant device 102 can include various other components that are not shown, examples of which include removable storage, a power source, such as a battery and power control unit, a barcode scanner, a printer, a cash drawer, and so forth.

In addition, in some examples, the merchant device 102 can include or can be connectable to a reader device 104, for reading payment instruments and/or identifiers associated with payment objects. In some examples, as described above, the reader device 104 can plug in to a port in the merchant device 102, such as a microphone/headphone port, a data port, or other suitable port. The reader device 104 can include a read head for reading a magnetic strip of a payment card, and further can include encryption technology for encrypting the information read from the magnetic strip. Additionally or alternatively, the reader device 104 can be a Europay, MASTERCARD®, VISA® (EMV) payment reader, which in some examples, can be embedded in the merchant device 102. Moreover, numerous other types of readers can be employed with the merchant device 102 herein, depending on the type and configuration of the merchant device 102. As described above, in some examples, the reader device 102 can be configured to read identifiers from payment objects (e.g., RFID-enabled wristbands, non-payment cards, etc.). In such examples, the state module 1014 can receive an instruction to activate such functionality (e.g., from the server(s) 112) and can send an instruction to the reader device to activate such functionality. In another example, the server(s) 112 can send the instruction directly to the reader device 104.

The server(s) 112 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 112 as being present in a single location, these components and data can alternatively be distributed across different computing devices and different locations in any manner. Consequently, the functions can be implemented by one or more server computing devices, with the various functionality described above distributed in various ways across the different computing devices. Multiple server (s) 112 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 112 can include one or more processors 1024, one or more computer-readable media 1026, one or more communication interfaces 1028, and one or more input/output devices 1030. Each processor 1024 can be a single processing unit or a number of processing units, and can include single or multiple computing units or multiple processing cores. The processor (s) 1024 can be implemented as one or more microprocessors, microcomputers, microcontrollers, digital signal processors, central processing units, state machines, logic circuitries, and/or any devices that manipulate signals based on operational instructions. For example, the processor(s) 1024 can be one or more hardware processors and/or logic circuits of any suitable type specifically programmed or configured to execute the algorithms and processes described herein. The processor(s) 1024 can be configured to fetch and execute computer-readable instructions stored in the computer-readable media 1026, which can program the processor(s) 1024 to perform the functions described herein.

The computer-readable media 1026 can include volatile and nonvolatile memory and/or removable and non-removable media implemented in any type of technology for storage of information, such as computer-readable instructions, data structures, program modules, or other data. Such computer-readable media 1026 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 112, the computer-readable media 1026 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1026 can be used to store any number of functional components that are executable by the processors 1024. In many implementations, these functional components comprise instructions or programs that are executable by the processors 1024 and that, when executed, specifically configure the one or more processors 1024 to perform the actions attributed above to the service provider and/or payment processing service. Functional components stored in the computer-readable media 1026 can include the associations module 114, the transaction processing module 118, and the state module 120. At least some of the functionality associated with the associations module 114, the transaction processing module 118, and the state module 120 is described above with reference to FIGS. 1-9. Additional functional components stored in the computer-readable media 1026 can include an operating system 1032 for controlling and managing various functions of the server(s) 112.

In at least one example, the computer-readable media 1026 can include or maintain other functional components and data, such as other modules and data 1034, which can include programs, drivers, etc., and the data used or generated by the functional components. At least some of the databases described above with reference to FIGS. 1 and 6 can be included and/or maintained in the other modules and data 1032. In additional or alternate examples, one or more of the databases can be remotely located from the server(s) 112 and data stored in such databases can be accessible to the server(s) 112, as shown in FIG. 10. Further, the server(s) 112 can include many other logical, programmatic and physical components, of which those described above are merely examples that are related to the discussion herein.

The communication interface(s) 1028 can include one or more interfaces and hardware components for enabling communication with various other devices, such as over the network(s) 1002. For example, communication interface(s) 1028 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The server(s) 112 can further be equipped with various input/output (I/O) devices 1030. Such I/O devices 1030 can include a display, various user interface controls (e.g., buttons, joystick, keyboard, mouse, touch screen, etc.), audio speakers, connection ports and so forth.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

The invention claimed is:

1. A system comprising:
one or more processors;
one or more computer-readable media comprising one or more instructions, that when executed by the one or more processors, cause the one or more processors to perform operations comprising:
storing, in association with a point-of-sale (POS) application executable by a POS device associated with a merchant, an identifier associated with payment data corresponding to a payment instrument of a customer for use in future transactions between the merchant and the customer;
determining, by a payment processing service, that one or more other merchants associated with the payment processing service are participating in a same event as the merchant;
receiving, by the payment processing service and from the POS application, a request to provision the payment data to the one or more other merchants to enable the one or more other merchants to use the identifier to complete one or more transactions with the customer without requiring the customer to present the payment instrument in association with the one or more transactions in association with the one or more other merchants; and
provisioning, by the payment processing service, the identifier to be used by one or more other POS devices of the one or more other merchants such that the identifier is temporarily stored by one or more POS applications of the one or more other POS devices, the payment processing service having received the identifier from the POS device.

2. The system as claim 1 recites, the operations further comprising:
receiving, at a reader device associated with the POS device, the payment data associated with the payment instrument of the customer;
receiving a request to store the payment data for use with future transactions between the merchant and the customer;
requesting, via the POS device, an identifier to be associated with the customer and the payment data; and
associating the identifier with the payment data.

3. The system as claim 1 recites, wherein requesting the identifier to be associated with the customer and the payment data comprises requesting at least one of a photo, a phone number, or an email address associated with the customer.

4. The system as claim 1 recites, the operations further comprising:
receiving geolocation data associated with the POS device and the one or more other POS devices of the one or more other merchants;
determining that the POS device and the one or more other POS devices are within a threshold distance of each other in a location known to be associated with the event; and
determining that the one or more other merchants and the merchant are participating in the same event based at least in part on determining that the POS device and the one or more other POS devices are within the threshold distance of each other in the location known to be associated with the event.

5. The system as claim 1 recites, the operations further comprising:
determining a duration of the event, the duration associated with a period of time;
determining a lapse of the period of time; and
sending, to the one or more other POS devices and based at least in part on the lapse of the period of time, an instruction to delete the identifier to restrict the one or more other merchants from using the identifier to complete transactions with the customer without requiring the customer to present the payment instrument in association with the transactions.

6. The system as claim 1 recites, wherein the identifier, when sent to the one or more other POS devices, is associated with at least one of a time limitation or a location limitation, and the operations further comprise restricting access, by respective instances of the POS application and for the one or more other merchants, to the identifier based on at least one of the time limitation or the location limitation.

7. The system as claim 1 recites, the operations further comprising:
receiving, from an individual POS device of the one or more other POS devices, transaction data associated with a transaction and an authorization request to authorize the payment instrument associated with the identifier for a cost of the transaction;
accessing the payment data associated with the identifier; and
processing the transaction based at least in part on the transaction data and the payment data.

8. A computer-implemented method comprising:
storing, in association with a point-of-sale (POS) application executable by a POS device associated with a merchant, an identifier associated with payment data corresponding to a payment instrument of a customer for use in future transactions between the merchant and the customer;
determining, by a payment processing service, that one or more other merchants associated with the payment processing service are participating in a same event as the merchant;
receiving, by the payment processing service and via the POS application, a request to provision the identifier to the one or more other merchants to enable the one or more other merchants to use the identifier to complete one or more transactions with the customer without requiring the customer to present the payment instrument in association with the one or more transactions in association with the same event; and
provisioning, from the payment processing service, the identifier to one or more other POS devices of the one or more other merchants such that the identifier is temporarily stored by one or more POS applications of the one or more other POS devices, the payment processing service having received the identifier from the POS device.

9. The computer-implemented method as claim 8 recites, further comprising:
receiving, at a reader device associated with the POS device, the payment data associated with the payment instrument of the customer;
receiving a request to store the payment data for use with future transactions between the merchant and the customer;
requesting, via the POS application, an identifier to be associated with the payment data and the customer; and
associating the identifier with the payment data.

10. The computer-implemented method as claim 8 recites, wherein requesting the identifier to be associated with the payment data and the customer comprises requesting at least one of a photo, a phone number, or an email address associated with the customer.

11. The computer-implemented method as claim 8 recites, further comprising:
receiving geolocation data associated with the POS device and the one or more POS devices of the one or more other merchants;
determining that the POS device and the one or more other POS devices are within a threshold distance of each other in a location known to be associated with the same event; and
determining that the one or more other merchants and the merchant are participating in the same event based at least in part on determining that the POS device and the one or more other POS devices are within the threshold distance of each other in the location known to be associated with the event.

12. The computer-implemented method as claim 8 recites, wherein the identifier, when sent to the one or more other POS devices, is associated with at least one of a time limitation or a location limitation, and the method further comprising restricting access, by instances of POS applications executing on respective POS devices and for the one or more other merchants, to the identifier based on at least one of the time limitation or the location limitation.

13. The computer-implemented method as claim 8 recites, further comprising:
receiving, from an individual POS device of the one or more other POS devices, transaction data associated with a transaction and an authorization request to authorize the payment instrument associated with the identifier for a cost of the transaction;
accessing the payment data associated with the identifier; and
processing the transaction based at least in part on the transaction data and the payment data.

14. The computer-implemented method as claim 13 recites, further comprising:
sending, to the individual POS device and prior to processing the transaction, a request to authenticate the transaction by presentation of an RFID-enabled wristband device, a wristband identifier associated with the payment data;
receiving, from the POS device, the wristband identifier; and
processing the transaction based at least in part on the wristband identifier.

15. One or more computer-readable media comprising one or more instructions, that when executed by one or more processors, cause the one or more processors to perform operations comprising:
storing, in association with a point-of-sale (POS) application executable by a POS device associated with a merchant, an identifier associated with payment data corresponding to a payment instrument of a customer for use in future transactions between the merchant and the customer;
determining, by a payment processing service, that one or more other merchants associated with the payment processing service are participating in the same event as the merchant;
receiving, by the payment processing service and from the POS application, a request to provision the payment data to the one or more other merchants to enable the one or more other merchants to use the identifier to complete one or more transactions with the customer without requiring the customer to present the payment instrument in association with the one or more transactions in association with the one or more other merchants; and
provisioning, by the payment processing service, the identifier to be used by one or more other POS devices of the one or more other merchants such that the identifier is temporarily stored by one or more POS applications of the one or more other POS devices, the payment processing service having received the identifier from the POS device.

16. The one or more computer-readable media as claim 15 recites, the operations further comprising:
receiving, at a reader device associated with the POS device, the payment data associated with the payment instrument of the customer;
receiving a request to store the payment data for use with future transactions between the merchant and the customer;
requesting, via the POS device, an identifier to be associated with the customer and the payment data; and
associating the identifier with the payment data.

17. The one or more computer-readable media as claim 15 recites, the operations further comprising:
receiving geolocation data associated with the POS device and the one or more other POS devices of the one or more other merchants;
determining that the POS device and the one or more other POS devices are within a threshold distance of each other in a location known to be associated with the event; and
determining that the one or more other merchants and the merchant are participating in the same event based at least in part on determining that the POS device and the one or more other POS devices are within the threshold distance of each other in the location known to be associated with the event.

18. The one or more computer-readable media as claim 15 recites, the operations further comprising:
determining a duration of the event, the duration associated with a period of time;
determining a lapse of the period of time; and
sending, to the one or more other POS devices and based at least in part on the lapse of the period of time, an instruction to delete the identifier to restrict the one or more other merchants from using the identifier to complete transactions with the customer without requiring the customer to present the payment instrument in association with the transactions.

19. The one or more computer-readable media as claim 15 recites, wherein the identifier, when sent to the one or more other POS devices, is associated with at least one of a time limitation or a location limitation, and the operations further comprise restricting access, by respective instances of the POS application and for the one or more other merchants, to the identifier based on at least one of the time limitation or the location limitation.

20. The one or more computer-readable media as claim 15 recites, the operations further comprising:
receiving, from an individual POS device of the one or more other POS devices, transaction data associated with a transaction and an authorization request to authorize the payment instrument associated with the identifier for a cost of the transaction;
accessing the payment data associated with the identifier; and
processing the transaction based at least in part on the transaction data and the payment data.

* * * * *